United States Patent
Horiguchi

(10) Patent No.: US 7,738,529 B2
(45) Date of Patent: Jun. 15, 2010

(54) WIRELESS COMMUNICATION APPARATUS AND WIRELESS COMMUNICATION METHOD

(75) Inventor: Tomoya Horiguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 844 days.

(21) Appl. No.: 11/469,099

(22) Filed: Aug. 31, 2006

(65) Prior Publication Data
US 2007/0064770 A1    Mar. 22, 2007

(30) Foreign Application Priority Data
Sep. 22, 2005  (JP)  ............... 2005-275616

(51) Int. Cl.
*H04B 1/00*      (2006.01)
(52) U.S. Cl. ............... 375/133; 375/132; 375/134; 375/135; 375/138; 375/285; 375/346
(58) Field of Classification Search .......... 375/132, 375/134, 135, 138, 285, 346
See application file for complete search history.

(56) References Cited

U.S. PATENT DOCUMENTS 6,240,126 B1 *    5/2001   Ohashi et al. ............... 375/132
7,457,259 B2 *   11/2008   Chang et al. ............... 370/317
7,483,676 B2 *    1/2009   Mizukami et al. ........... 455/68
2008/0165832 A1 *  7/2008  Fukuda et al. .............. 375/134

FOREIGN PATENT DOCUMENTS

JP       9-200086      7/1997
JP     2004-254204     9/2004

* cited by examiner

*Primary Examiner*—Shuwang Liu
*Assistant Examiner*—Dhaval Patel
(74) *Attorney, Agent, or Firm*—Oblon, Spivak, McClelland, Maier & Neustadt, L.L.P.

(57) ABSTRACT

There is provided with there is provided with a wireless communication method using a frequency hopping scheme, which performs wireless communication with a different wireless communication apparatus by using a plurality of frequency bands, including: measuring interference quantities showing strength of interference signals in respective frequency bands; selecting a hopping pattern from a plurality of hopping patterns each having hopping densities set for the respective frequency bands on the basis of the interference quantities in the respective frequency bands, the hopping densities being the number of times that transmission is performed per unit time in the respective frequency bands; notifying the different wireless communication apparatus of the selected hopping pattern; and communicating with the different wireless communication apparatus by using the selected hopping patter.

18 Claims, 18 Drawing Sheets

WIRELESS COMMUNICATION APPARATUS AND WIRELESS COMMUNICATION METHOD

CROSS-REFERENCE TO RELATED APPLICATIONS

This application is based upon and claims the benefit of priority from the prior Japanese Patent Applications No. 2005-275616 filed on Sept. 22, 2005, the entire contents of which are incorporated herein by reference.

BACKGROUND OF THE INVENTION

1 Field of the Invention

The present invention relates to a wireless communication apparatus and a wireless communication method, in particular, to a wireless communication apparatus and a wireless communication method for performing cognitive radio communication using frequency hopping.

2 Related Art

In conventional wireless communication using frequency hopping, there is a following communication method as an example. In the method, radio wave environments (received levels) of available frequency channels in a plurality of frequency channels are measured, the available frequency channels are ranked in ascending order of received level, and communication is performed by frequency hopping in this order (see JP-A 1997-200086(KOKAI)).

Furthermore, there is also an example in which it is proposed to cope with a change of the environment rapidly by using the UWB (Ultra WideBand) for communication of control signals in conventional cognitive radio communication systems (See "Implementation Issues in Spectrum Sensing for Cognitive Radios," Danijera Cabric, Shridhar Mubaraq Mishra, Robert W. Brodersen, Berkeley Wireless Research Center, Asilomar Conference on Signals, Systems and Computers, 2004)

In the conventional scheme described in the above JP-A 1997-200086(KOKAI), however, the available frequency channels are merely selected in order of less interference. Even if frequency channels having less interference exist in the available frequency channels, therefore, it cannot be said that the frequency channels having less interference are enough utilized efficiently.

In the latter-cited conventional scheme, it is necessary to provide a wireless communication apparatus capable of performing two communications of an ordinary cognitive radio communication and a UWB wireless communication. A problem is posed from the viewpoint of reducing the size and power consumption of the wireless communication terminal.

SUMMARY OF THE INVENTION

According to an aspect of the present invention, there is provided with a wireless communication apparatus using a frequency hopping scheme, which performs wireless communication with a different wireless communication apparatus by using a plurality of frequency bands, comprising: an interference measurer configured to measure interference quantities showing strength of interference signals in respective frequency bands; a hopping pattern storage configured to store a plurality of hopping patterns each having hopping densities set for the respective frequency bands, the hopping densities being the number of times that transmission is performed per unit time in the respective frequency bands; a hopping pattern selector configured to select a hopping pattern from the hopping pattern storage on the basis of the interference quantities in the respective frequency bands; a hopping pattern notifier configured to notify the different wireless communication apparatus of the selected hopping pattern; and a communicator configured to communicate with the different wireless communication apparatus by using the selected hopping pattern.

According to an aspect of the present invention, there is provided with a wireless communication method using a frequency hopping scheme, which performs wireless communication with a different wireless communication apparatus by using a plurality of frequency bands, comprising: measuring interference quantities showing strength of interference signals in respective frequency bands; selecting a hopping pattern from a plurality of hopping patterns each having hopping densities set for the respective frequency bands on the basis of the interference quantities in the respective frequency bands, the hopping densities being the number of times that transmission is performed per unit time in the respective frequency bands; notifying the different wireless communication apparatus of the selected hopping pattern; and communicating with the different wireless communication apparatus by using the selected hopping pattern.

DETAILED DESCRIPTION OF THE INVENTION

Hereafter, an embodiment will be described in detail with reference to the drawings.

Figure 1:
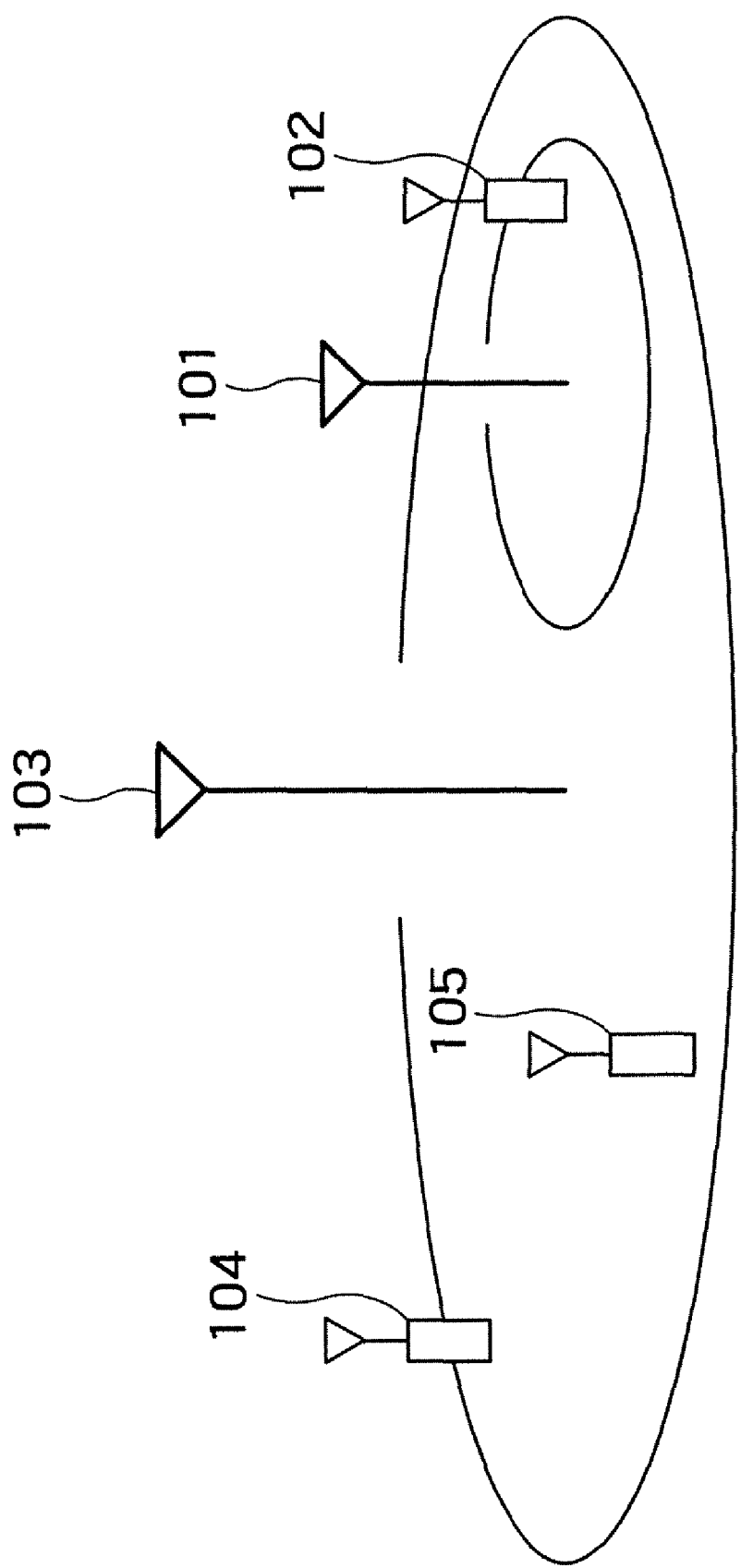
FIG. 1 is a diagram showing an example of a configuration of a system according to an embodiment of the present invention.

FIG. 1 shows a configuration of an embodiment according to the present invention. A wireless transceiver 101 and a wireless transceiver 102 perform wireless communication by using a certain communication scheme. A wireless transceiver 103 and wireless transceivers 104 and 105 perform wireless communication by using another communication scheme. The communication between the wireless transceiver 101 and the wireless transceiver 102, and communication between the wireless transceiver 103 and the wireless transceivers 104 and 105 have no clear distinction between them in geography, frequency and time, and share common resources. For example, if the wireless transceiver 103 is a TV broadcasting station and the wireless transceivers 104 and 105 are TV receivers, then the wireless transceiver 101 and the wireless transceiver 102 are a CR-ST (Cognitive Radio Station) and a CR-AP (Cognitive Radio-Appliance) permitted to use a TV frequency band, and the wireless transceiver 101 and the wireless transceiver 102 communicate by using time and a frequency in which TV broadcasting is not performed. By way of another example, if the wireless transceiver 103 is a wireless LAN base station (WLAN-ST) and the wireless transceivers 104 and 105 are wireless LAN appliance (WLAN-AP), then the wireless transceiver 101 and the wireless transceiver 102 are respectively a cognitive radio station (CR-ST) and a cognitive radio-appliance (CR-AP) permitted to use unlicensed bands of 2.4 GHz and 5 GHz. In this case, the cognitive radio station (CR-ST) and the cognitive radio-appliance (CR-AP) communicate by using a band and time in which the wireless LAN base station (WLAN-ST) and the wireless LAN appliance (WLAN-AP) are not communicating. Here, the range of the communication area of the cognitive radio station (CR-ST) and the cognitive radio-appliance (CR-AP) may be a range equal to that of the communication area of the wireless transceivers 103, 104 and 105, or may be a range which is larger or smaller than that of the communication area of the wireless transceivers 103, 104 and 105.

First Embodiment

Figure 2:
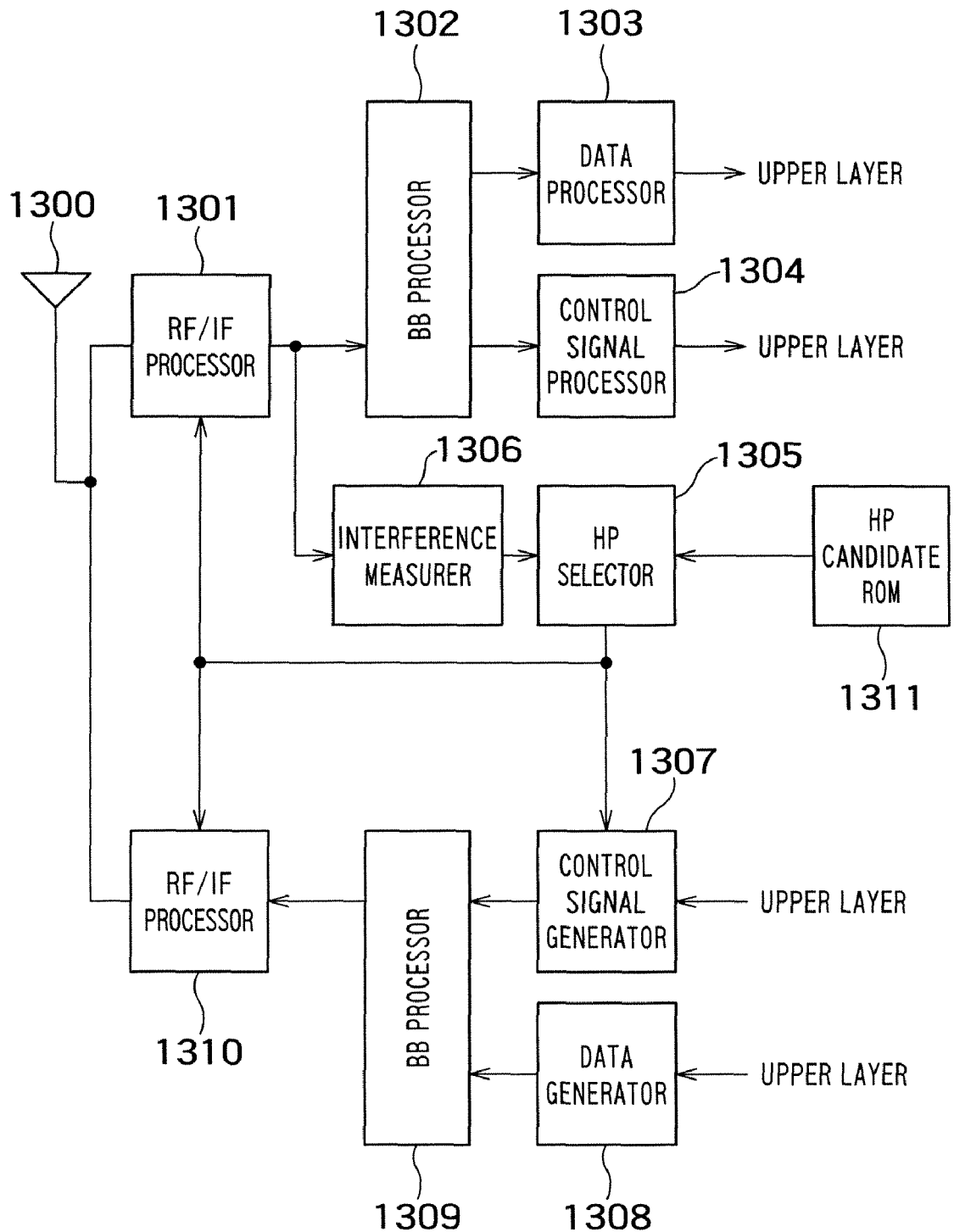
FIG. 2 is a diagram showing a configuration of a station in a first embodiment.

FIG. 2 shows a configuration example of a station 101 in a first embodiment.

The cognitive radio station (CR-ST) (hereafter referred to simply as station) 101 communicates with a cognitive radio-appliance (CR-AP) (hereafter referred to simply as appliance) 102 by using the frequency hopping scheme. Prior to starting communication with the appliance 102, the station 101 determines a hopping pattern (HP). The station 101 first measures interference quantities of respective frequency bands in overall frequency band used for communication in order to determine the hopping pattern. In detail, the station 101 receives a radio signal at an antenna 1300, and the signal received at the antenna 1300 is subjected to RF/IF signal processing in an RF (Radio Frequency)/IF (Intermediate Frequency) processor 1301, and then converted to a baseband signal in the RF/IF processor 1301. An interference measurer 1306 measures the interference quantities in the frequency bands by using the baseband signal (interference measurement processing). In this example, the interference measurement processing is performed using the baseband signal. Alternatively, the interference measurement processing may be performed using an RF signal or an IF signal. A result of the interference measurement is input to an HP selector 1305. The HP selector 1305 compares the measured interference quantities with a predetermined threshold, and selects a hopping pattern according to a result of the comparison. Candidates of the hopping pattern are stored in an HP candidate ROM 1311. The selected hopping pattern is conveyed from the HP selector 1305 to the RF/IF processor 1301, an RF/IF processor 1310 and a control signal generator 1307. In the control signal generator 1307, the selected hopping pattern is converted to a hopping pattern selection signal by which the hopping pattern can be identified on the appliance 102 side (for example, an index by which the hopping pattern can be uniquely selected), multiplexed with a control signal from an upper layer (such as, for example, a control signal indicating data communication start time), and transmitted from the antenna 1300 via a BB (BaseBand) processor 1309 and the RF/IF processor 1310 as a hopping pattern notice (HP notice). Thereafter, communication of the data signal and the control signal is started using the selected hopping pattern. In other words, the data signal received from the appliance 102 is input to a data processor 1303 via the RF/IF processor 1301 and a BB processor 1302. The control signal is input to a control signal processor 1304. The data signal is converted in the data processor 1303 to a signal which can be understood by the upper layer (is subjected to error correction decoding and deinterleaving) and output to the upper layer. In the same way, the control signal is also converted in the control signal processor 1304 to a signal which can be understood by the upper layer, and output to the upper layer. A data signal and a control signal output from the upper layer are subjected, respectively in a data generator 1308 and the control signal generator 1307, to conversion for performing communication (such as, for example, error correction coding and interleaving), and transmitted from the antenna 1300 to the appliance 102 via the BB processor 1309 and the RF/IF processor 1310.

Figure 3:
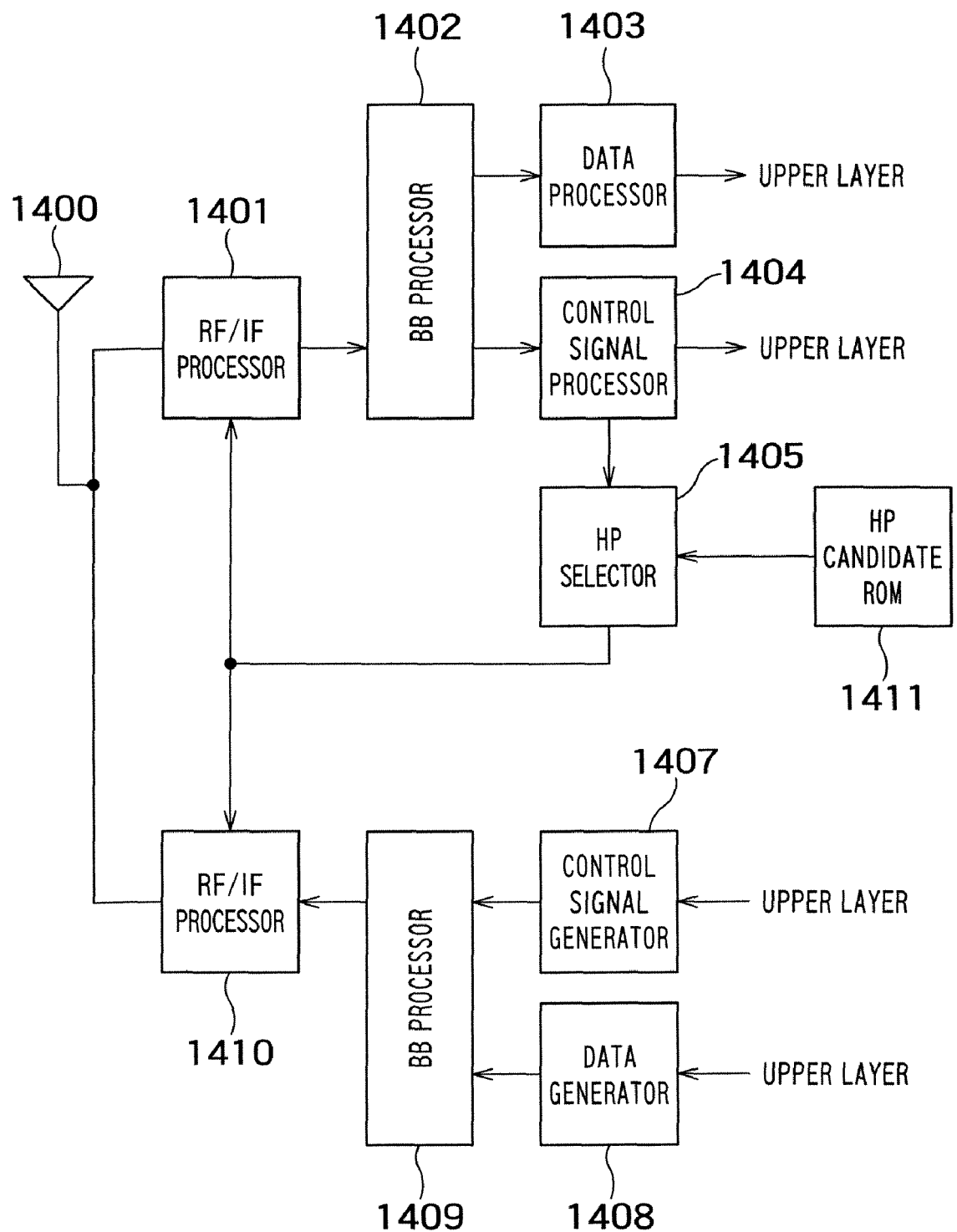
FIG. 3 is a diagram showing a configuration of an appliance in a first embodiment and a third embodiment.

FIG. 3 shows a configuration example of the appliance 102 in the first embodiment.

The appliance 102 waits for a hopping pattern notice from the station 101. The appliance 102 receives an arriving signal at an antenna 1400. The signal received by the antenna 1400 is passed through an RF/IF processor 1401 and a BB processor 1402, and processed in a control signal processor 1404. Upon decoding the hopping pattern selection signal contained in the hopping pattern notice transmitted from the station 101, the control signal processor 1404 outputs a result of the decoding to an HP selector 1405. The HP selector 1405 takes out a hopping pattern stored in an HP candidate ROM 1411 on the basis of the decoded hopping pattern selection signal, and conveys the hopping pattern to the RF/IF processor 1401 and an RF/IF processor 1410. At the same time, the control signal processor 1404 outputs a control signal (such as, for example, a control signal indicating data communication start time) contained in the hopping pattern notice supplied from the upper layer of the station 101 to an upper layer. Thereafter, communication of the data signal and control signal is started using the selected hopping pattern. In other words, the received data signal is input to a data processor 1403 via the RF/IF processor 1401 and the BB processor 1402. The control signal is input to the control signal processor 1404. The data signal is converted in the data processor 1403 to a signal which can be understood by the upper layer (is subjected to error correction decoding and deinterleaving) and output to the upper layer. Furthermore, the control signal is also converted in the control signal processor 1404 to a signal which can be understood by the upper layer, and output to the upper layer. A data signal and a control signal output from the upper layer are subjected, respectively in a data generator 1408 and a control signal generator 1407, to conversion for performing communication (such as, for example, error correction coding and interleaving), and transmitted from the antenna 1400 to the station 101 via a BB processor 1409 and the RF/IF processor 1410.

Figure 4:
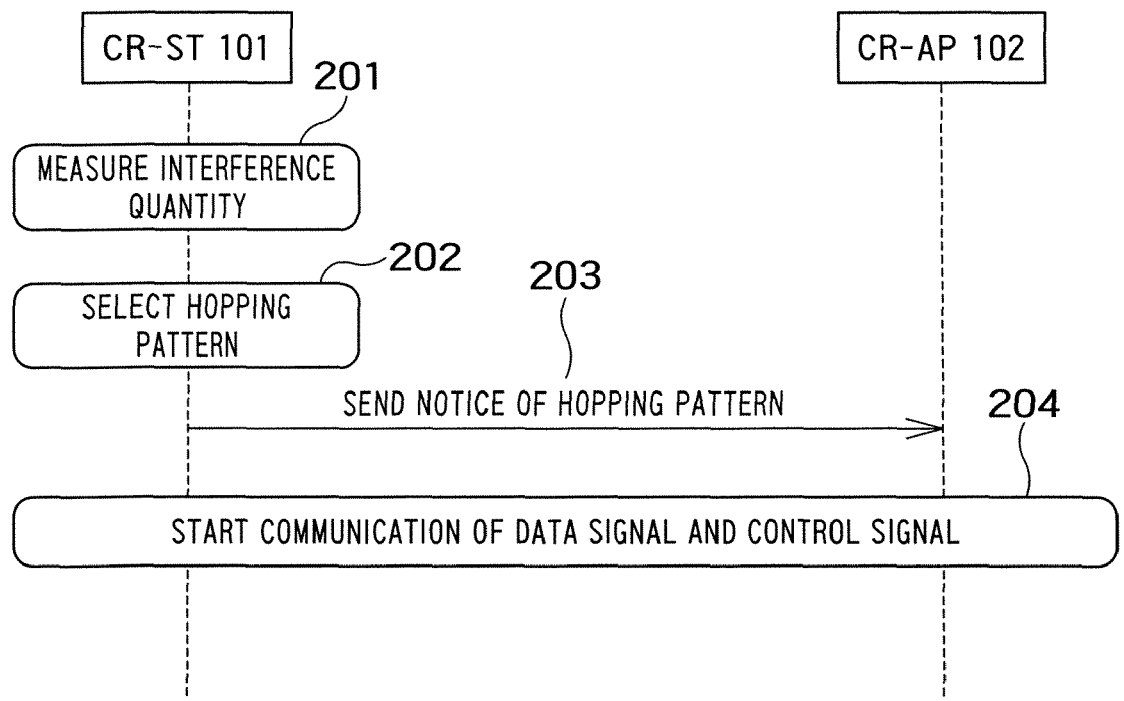
FIG. 4 is a diagram showing an example of a processing procedure at the time of start of communication between a station and an appliance in a first embodiment.

FIG. 4 shows an example of a processing procedure at the time of start of communication between the station 101 and the appliance 102 in the first embodiment.

Before starting communication, the station 101 measures the interference quantities in the frequency bands in the periphery of the station 101 (201). In detail, the measurement of the interference quantities is performed by, for example, dividing an overall frequency band which can be used for transmission by the cognitive radio system into several parts and measuring the interference quantity in each of frequency bands obtained by the division. Here, the interference quantity is an index showing strength of interference signals in each frequency band obtained by the division. The interference quantity is, for example, a value of total received power (RSSI: Receive Signal Strength Indication). Instead of the RSSI, "EVM (Error Vector Magnitude)", "interference signal power-to-signal power ratio", "bit error rate" or the like may used as the interference quantity.

Subsequently, a hopping pattern for performing communication is selected (202). The selection of the hopping pattern is performed on the basis of the interference quantity in each of frequency bands obtained by the division measured at the step 201. Details of the selection method will be described later.

A notice of the selected hopping pattern is sent to the appliance 102 which is the opposite party (destination terminal) of the communication (203). As for this notice method, a method of sending a notice by using a dedicated channel for notice in the overall frequency band for the cognitive radio system, a method of selecting arbitrary one from predetermined hopping pattern candidates dedicated to hopping pattern notice and sending a notice by using the selected predetermined hopping pattern, and a method of sending a notice by wire are conceivable. If the notice of the hopping pattern is sent using a dedicated channel (dedicated frequency band), then the notice of the hopping pattern can be sent rapidly and certainly and consequently the system throughput can be increased. If the notice of the hopping pattern is sent using an already known hopping pattern for notice, then the receiving side may only wait for some of hopping pattern candidates for notice. Even if a dedicated channel is not provided, therefore, a notice of the hopping pattern can be sent rapidly. When sending a notice of the hopping pattern, another control signal (such as, for example, a signal for synchronization) may be transmitted as occasion demands. The hopping pattern is notified in a form capable of uniquely identifying the hopping pattern. For example, if the hopping pattern is selected from among several candidates, then an index indicating the hopping pattern may be notified. By sending a notice of the index, the quantity of data for the notice of the hopping pattern can be reduced. According to the procedure heretofore described, sharing and synchronization of the hopping pattern are performed between the station 101 and the appliance 102, and communication of the data signal and control signal is started (204).

Figure 5:
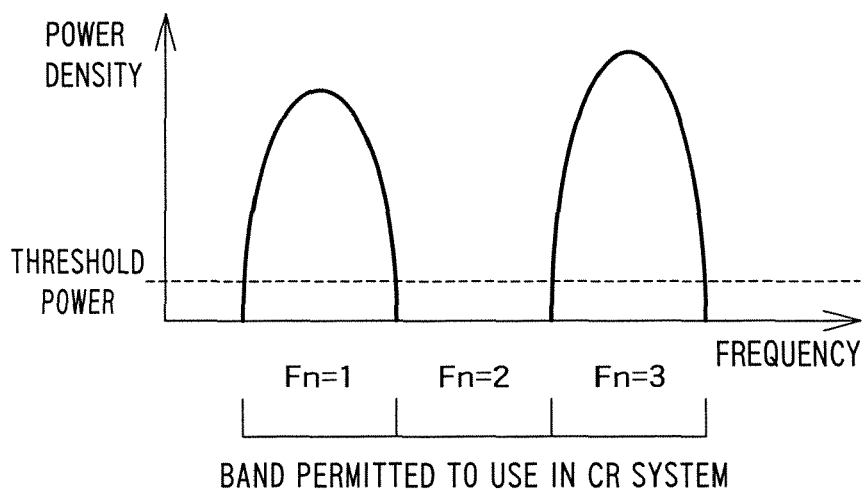
FIG. 5 is a diagram showing an example of a measurement result of an interference quantity.

FIG. 5 is a diagram showing an example of measurement of the interference quantity.

In FIG. 5, an overall frequency band permitted to be used by a cognitive radio system (CR system) is divided into three parts and the interference quantities in respective frequency bands is measured. Supposing a 5-GHz band, Fn=1 represents a frequency band having a center frequency of 4920 MHz and a bandwidth of 20 MHz, Fn=2 represents a frequency band having a center frequency of 4940 MHz and a bandwidth of 20 MHz, and Fn=3 represents a frequency band having a center frequency of 4960 MHz and a bandwidth of 20 MHz. First, in the frequency band Fn=1, total received power (RSSI) is measured. In the same way, in the frequency bands Fn=2 and the frequency band Fn=3 as well, the RSSI is measured. As the value of the RSSI becomes higher, the interference quantity is judged to be larger. If in this example the measured RSSI is higher than a threshold, then the interference is judged to be large. If the measured RSSI is equal to or lower than a threshold, then the interference is judged to be small. Here, the threshold is a concrete power value such as −60 dBm.

Figure 6:
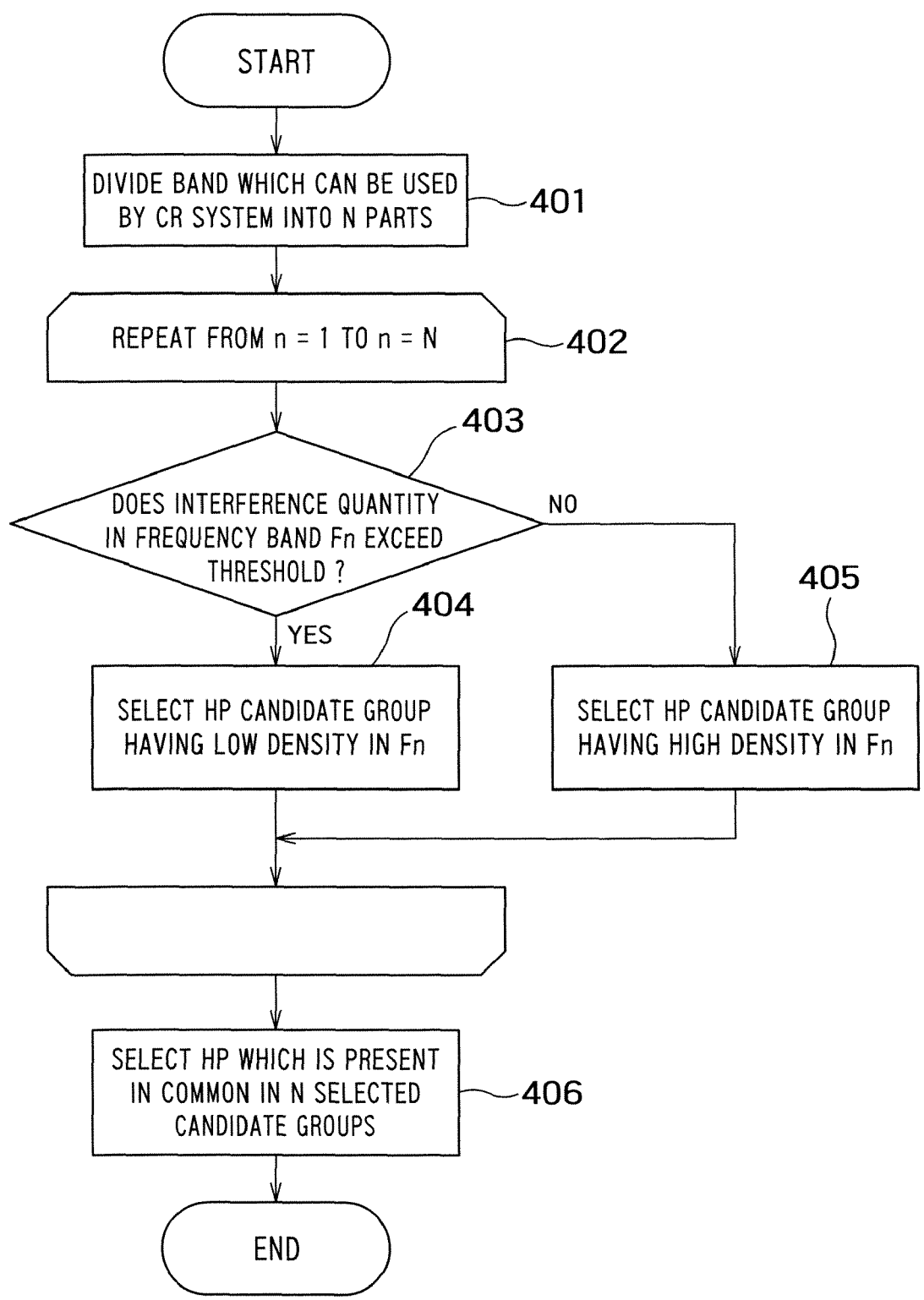
FIG. 6 is a flow chart showing an example of a hopping pattern selection method according to a first embodiment.

FIG. 6 is a flow chart showing an example of a hopping pattern selection method according to the first embodiment.

First, an overall frequency band which can be used by the cognitive radio system is divided into N regions (401). Here, N is an integer of 2 or more. As this value becomes greater, fast communication can be performed using finer vacant frequency bands. If N has a larger value, however, then the hopping pattern candidates increase and much labor is required for selection processing. For each of N bands Fn (n = 1 to N) obtained by the division, the following processing is performed (402).

As to the frequency band Fn, the measured interference quantity is compared with a threshold (403). If the interference quantity is higher than the threshold (YES at 403), the interference signal is judged to be great in the band Fn. In other words, it is judged that another cognitive radio appliance, or an appliance in a system other than the cognitive radio system is using the band Fn. In this case, hopping patterns having a low hopping density in the band Fn are selected from among a plurality of hopping patterns as hopping pattern candidate group (404).

Here, "hopping density" is the number of times transmission is performed using a certain carrier per unit time in the frequency hopping scheme using a plurality of frequency carriers. For example, the hopping density of a carrier used one hundred times during 10 ms is 10,000 times/second, and the hopping density of a carrier used five times during 10 ms is 500 times/second. At this time, it is supposed that the hopping density of the former carrier (having a hopping density of 10,000 times/second) is higher than the hopping density of the latter carrier (having a hopping density of 500 times/second).

If the interference quantity is the threshold or less at step 403 (NO at 403), the interference signal is judged to be small in the band Fn. In other words, it is judged that another cognitive radio appliance or an appliance in a system other than the cognitive radio system is not using the band Fn. In this case, hopping patterns having a high hopping density in the band Fn are selected from among the plurality of hopping patterns as hopping pattern candidate group (405).

From among N selected hopping pattern candidate groups, a hopping pattern which is present in common in the hopping pattern candidate groups in is determined as a hopping pattern to be used for communication (406).

Figure 7:
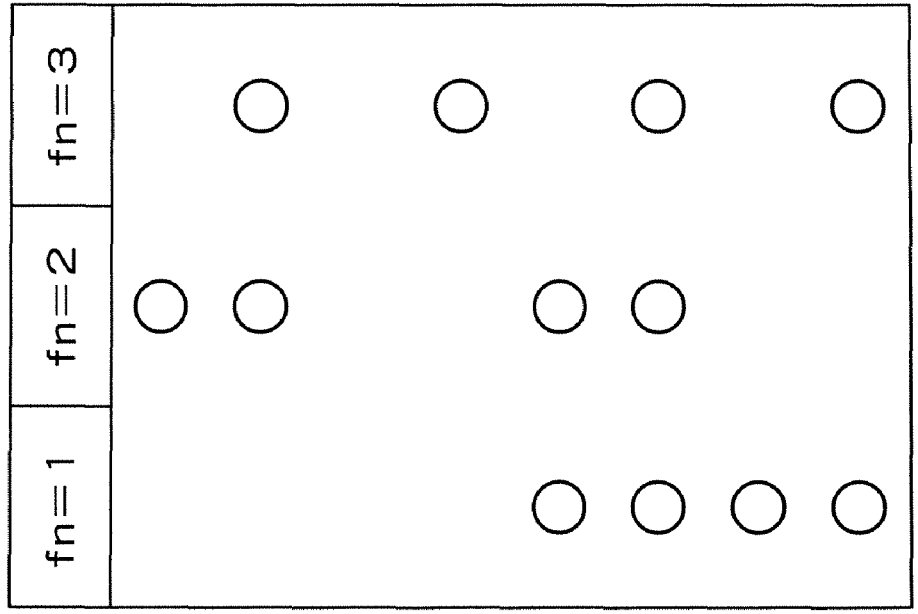
FIG. 7 is a diagram showing a concrete example of hopping pattern selection.

FIG. 7 is a diagram showing which hopping pattern is concretely selected by taking the case of the interference quantities shown in FIG. 5 as an example.

As for hopping patterns, for example, eight kinds ranging from No. 1 to No. 8 are prepared. A HP No. 4 has a high hopping density in the frequency band Fn=1,and a low hopping density in the frequency bands Fn=2 and Fn=3. In other words, the HP No. 4 has a first hopping density in the frequency band Fn=1,and a second hopping density which is smaller than the first hopping density in the frequency bands Fn =2 and Fn=3. If an interference measurement result as shown in FIG. 5 is obtained, the interference quantity in the frequency band Fn=1 is higher than the threshold. Therefore, the interference in Fn=1 is judged to be great, and hopping pattern candidates each having a low hopping density in Fn=1 are selected. Here, HP No. 5, No. 6, No. 7 and No. 8 are selected as candidates as shown in FIG. 7. Subsequently, in the frequency band Fn=2, the interference quantity is less than the threshold. The interference is judged to be small. Therefore, the frequency band Fn=2 is judged to be available. As a result, hopping pattern candidates which are high in hopping density in Fn=2, are selected. Here, HP No. 1, No. 2, No. 5 and No. 6 are selected as candidates as shown in FIG. 7. Finally, the interference quantity in the frequency band Fn=3 is higher than the threshold. The interference in Fn=3 is judged to be great. In Fn=3, hopping pattern candidates which are low in hopping density are selected. Here, HP No. 2, No. 4, No. 6 and No. 8 are selected as candidates as shown in FIG. 7. From among hopping pattern candidates thus selected, a hopping pattern which becomes a candidate in common in the three bands (Fn=1, 2 , 3) is selected. Here, the HP No. 6 is selected as the hopping pattern which performs communication.

In the present example, two hopping densities (the high hopping density and the low hopping density) are indicated. Alternatively, there may be three hopping densities or more. Furthermore, only one threshold is used. Alternatively, two thresholds or more may be used. In this case, a hopping density may be set in each of sections partitioned by the two thresholds or more.

In the present example, a hopping density (the high hopping density or the low hopping density) is determined and hopping patterns are selected every frequency band. In the case where there are three hopping densities or more, however, a hopping pattern may be determined by synthetically evaluating the interference quantities in respective frequency bands. For example, it is now supposed that there are three hopping densities (first to third hopping densities) and the first hopping density is the greatest whereas the third hopping density is the least. If the interference quantity in the frequency band Fn=1 is the threshold or less and the interference quantity in the frequency bands Fn=2 and Fn=3 is greater than the threshold, then a hopping pattern having the first hopping density in the frequency band Fn=1 and having the third hopping density in the frequency bands Fn=2 and Fn =3 may be selected. On the other hand, if the interference quantity in the frequency bands Fn=1 and Fn=2 is the threshold or less and the interference quantity in the frequency band Fn=3 is greater than the threshold, then a hopping pattern having the second hopping density in the frequency bands Fn=1 and Fn=2 and having the third hopping density in the frequency bands Fn=3 may be selected.

Figure 8:
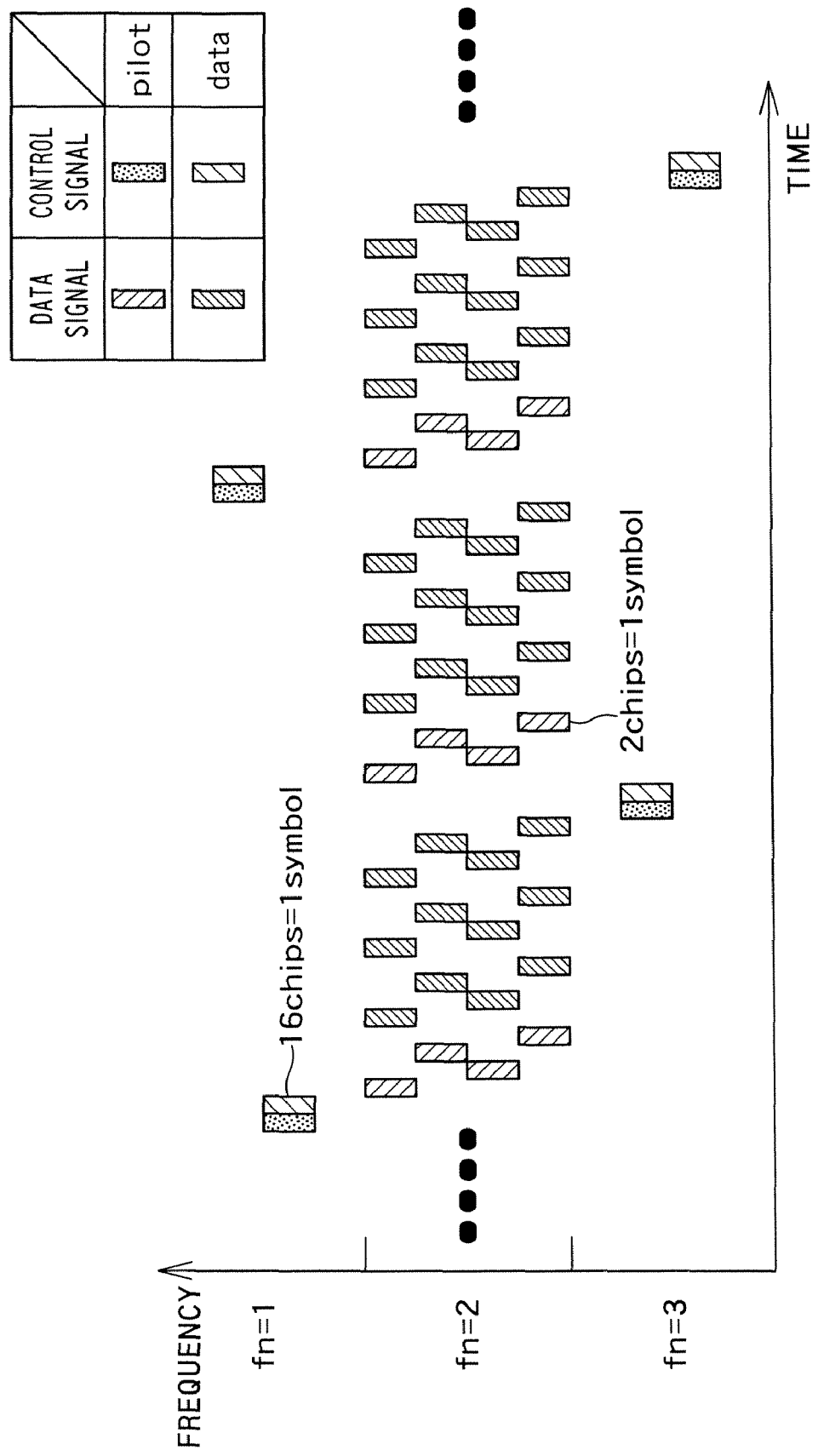
FIG. 8 is a diagram showing an example of a hopping pattern in data signal communication and control signal communication.

FIG. 8 shows an example of a hopping pattern.

In the ensuing description, the case of the HP No. 6 shown in FIG. 7 is taken as an example. The HP No. 6 has a low hopping density in each of the frequency bands Fn=1 and Fn=3, and has a high hopping density in the frequency band Fn=2. It is supposed that the actual hopping density in each frequency band Fn is associated with the HP No. 6 and determined previously. In each of the frequency bands Fn=1 and Fn=3, a control signal is transmitted with a low hopping density. The control signal includes, for example, a modulation scheme, an error correction coding factor and a data spreading factor used in data signal communication, data frame synchronization information, user identification information, a measured interference power situation, a data communication start flag, or a data communication pausing (stopping) flag. The receiving side receives a control signal, and performs processing such as synchronization. Since interference is present in frequency bands which are low in hopping density at this time, it is desirable to strengthen the resistance against errors by adopting a modulation scheme which is resistant to noise, such as the BPSK or the differential ASK, raising the spreading factor, or raising the coding factor of error correction. In FIG. 8, the control signal is provided with a spreading factor of 16 to have stronger error resistance than the data signal. By raising the spreading factor of the control signal, signal transmission and reception can be performed with high precision even in a frequency band having large interference. On the other hand, in the frequency band Fn=2, fast data communication is performed by performing communication using vacant channels (vacant frequency bands) having less interference. Because of data communication in a vacant channel, data are transferred at high speed by suppressing redundant signals at the utmost, using a low spreading factor and a low error correction coding, and adopting a highly efficient modulation scheme such as the 16QAM. Fast communication becomes possible by lowering the spreading factor of the data communication signal. Pilot signals shown in FIG. 8 are already known signals for synchronization.

According to the present embodiment, the hopping pattern is determined according to the interference quantity in each frequency band measured before the start of the communication, as heretofore described. As a result, it is possible to use the frequency bands efficiently and implement fast data communication. In other words, if a vacant frequency band is present, fast or large capacity communication can be performed. In addition, even if a vacant frequency band becomes absent during the communication, the communication can be continued while holding down the interference given to surrounding communication devices to the minimum. By thus continuing the communication, the overhead caused by the communication stopping processing and resuming processing can be reduced, and consequently the system throughput can be improved.

Second Embodiment

Figure 9:
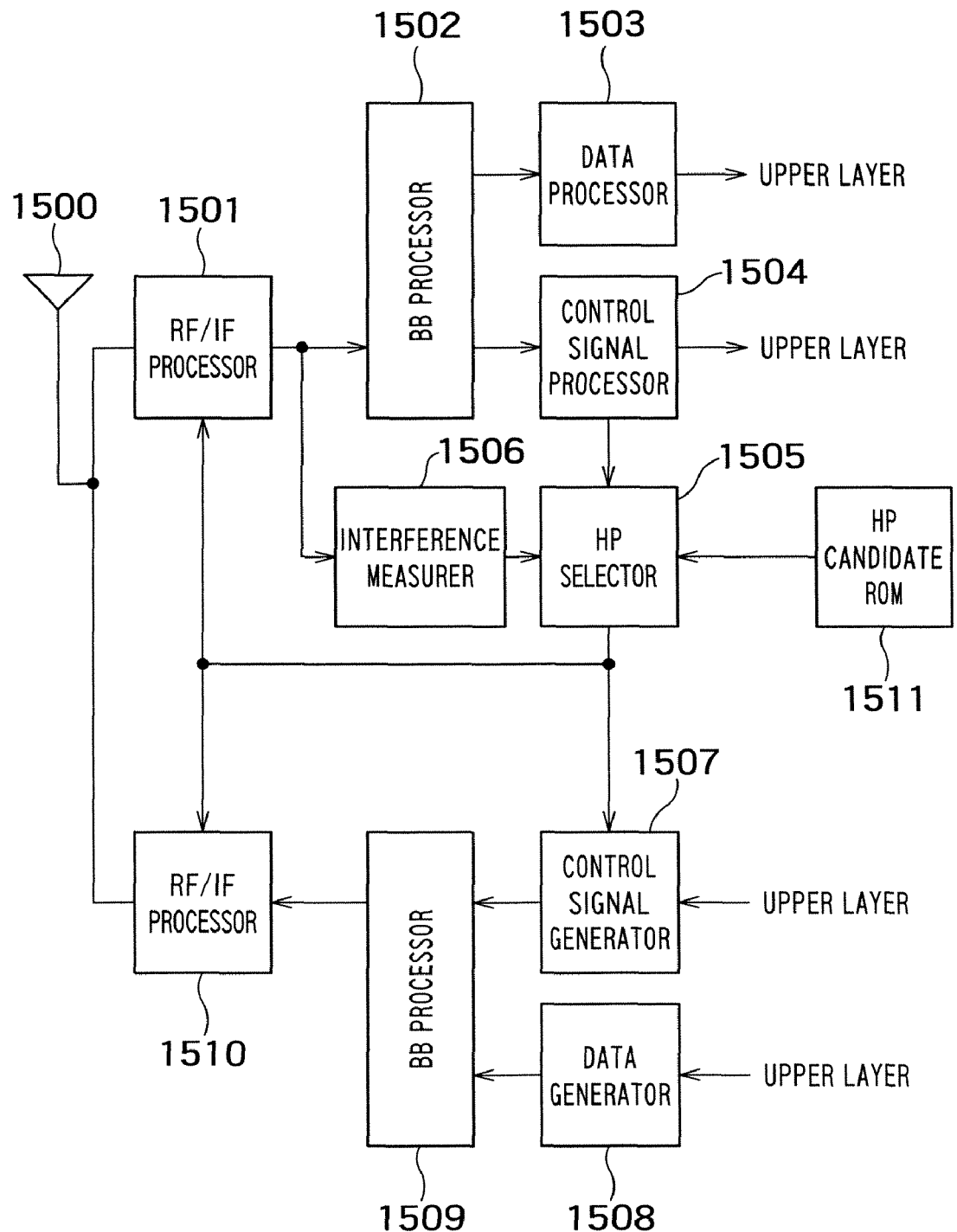
FIG. 9 is a diagram showing a configuration of a station in a second embodiment.

FIG. 9 shows a example of the station 101 in a second embodiment.

The station 101 receives a radio signal at an antenna 1500, and the signal received at the antenna 1500 is subjected to RF/IF signal processing in an RF/IF processor 1501, and then converted to a baseband signal in the RF/IF processor 1501. An interference measurer 1506 performs the interference measurement processing by using the baseband signal. In this example, the interference measurement is performed using the baseband signal. Alternatively, the interference quantities may be measured using an RF signal or an IF signal. A result of the interference measurement is input to an HP selector 1505. Furthermore, the station 101 waits for an interference quantity notice transmitted from the appliance 102 in order to acquire a result of the interference quantity measurement performed by the appliance 102. The signal received at the antenna 1500 is input to a control signal processor 1504 via the RF/IF processor 1501 and a BB processor 1502. If an interference notice signal supplied from the appliance 102 is decoded in the control signal processor 1504, the control signal processor 1504 outputs a result of the decoding to the HP selector 1505. The HP selector 1505 selects a hopping pattern from an HP candidate ROM 1511 on the basis of the interference quantities measured in the interference measurer 1506 and the interference quantities notified of by the appliance 102 and a predetermined threshold. The selected hopping pattern is conveyed to the RF/IF processor 1501, an RF/IF processor 1510 and a control signal generator 1507. In the control signal generator 1507, the selected hopping pattern is converted to a hopping pattern selection signal by which the hopping pattern can be identified on the appliance 102 side, multiplexed with a control signal (such as, for example, a control signal indicating data communication start time) from an upper layer, and transmitted from the antenna 1500 via a BB processor 1509 and the RF/IF processor 1510 as a hopping pattern notice. Thereafter, communication of the data signal and the control signal is started using the selected hopping pattern. In other words, the received data signal is input to a data processor 1503 via the RF/IF processor 1501 and the BB processor 1502. The received control signal is input to the control signal processor 1504. The data signal is converted in the data processor 1503 to a signal which can be understood by the upper layer (is subjected to error correction decoding and deinterleaving) and output to the upper layer. In the same way, the control signal is also converted in the control signal processor 1504 to a signal which can be understood by the upper layer, and output to the upper layer. A data signal and a control signal output from the upper layer are subjected, respectively in a data generator 1508 and the control signal generator 1507, to conversion for performing communication (such as, for example, error correction coding and interleaving), and transmitted from the antenna 1500 to the appliance 102 via the BB processor 1509 and the RF/IF processor 1510.

Figure 10:
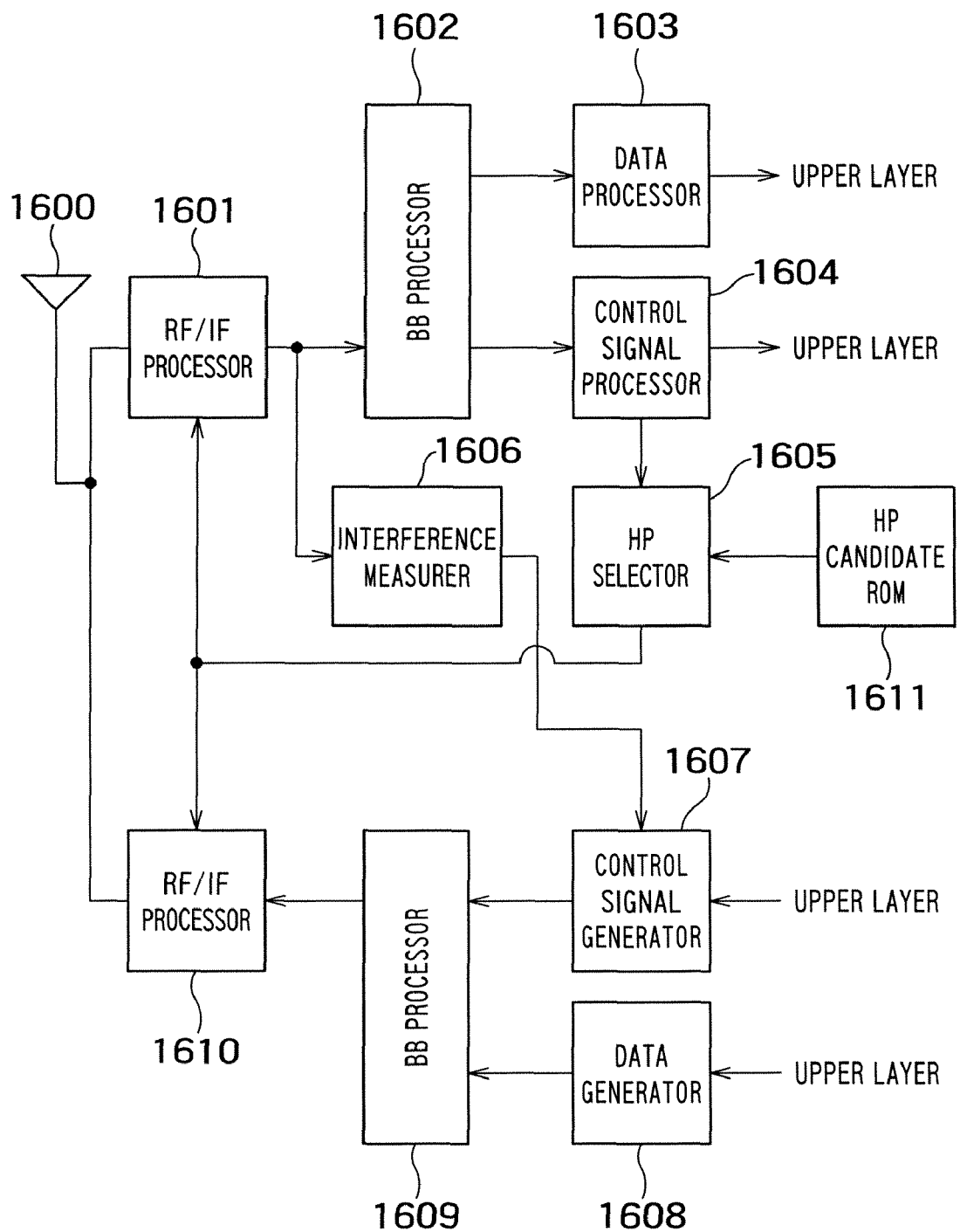
FIG. 10 is a diagram showing a configuration of an appliance in a second embodiment.

FIG. 10 shows a configuration example of the appliance 102 in the second embodiment.

The appliance 102 measures the interference quantities in the frequency bands in order to determine the hopping pattern in the station 101. In detail, the appliance 102 receives a radio signal at an antenna 1600. The signal received by the antenna 1600 is subjected to RF/IF signal processing in an RF/IF processor 1601, and then converted to a baseband signal in the RF/IF processor 1601. An interference measurer 1606 performs interference measurement processing by using the baseband signal. In this example, the interference measurement is performed using the baseband signal. Alternatively, the interference quantities may be measured using an RF signal or an IF signal. A result of the interference measurement is multiplexed in a control signal generator 1607 with a control signal supplied from the upper layer, and transmitted from the antenna 1600 via a BB processor 1609 and an RF/IF processor 1610 as an interference quantity notice. Furthermore, the appliance 102 waits for the hopping pattern notice transmitted from the station 101. A signal received at the antenna 1600 is passed through the RF/IF processor 1601 and a BB processor 1602, and processed in a control signal processor 1604. Upon decoding a hopping pattern selection signal contained in the hopping pattern notice transmitted from the station 101 in the control signal processor 1604, the control signal processor 1604 outputs a result of the decoding to an HP selector 1605. The HP selector 1605 takes out a hopping pattern from an HP candidate ROM 1611 on the basis of the decoded hopping pattern selection signal, and conveys the hopping pattern to the RF/IF processor 1601 and the RF/IF processor 1610. At the same time, the control signal processor 1604 outputs a control signal (such as, for example, a control signal indicating data communication start time) contained in the hopping pattern notice supplied from the upper layer of the station 101 to an upper layer. Thereafter, communication of the data signal and control signal is started using the selected hopping pattern. In other words, the received data signal is input to a data processor 1603 via the RF/IF processor 1601 and the BB processor 1602. The received control signal is input to the control signal processor 1604. The data signal is converted in the data processor 1603 to a signal which can be understood by the upper layer (is subjected to error correction decoding and deinterleaving) and output to the upper layer. Furthermore, the control signal is also converted in the control signal processor 1604 to a signal which can be understood by the upper layer, and output to the upper layer. A data signal and a control signal output from the upper layer are subjected, respectively in a data generator 1608 and a control signal generator 1607, to conversion for performing communication (such as, for example, error correction coding and interleaving), and transmitted from the antenna 1600 to the station 101 via a BB processor 1609 and the RF/IF processor 1610.

Figure 11:
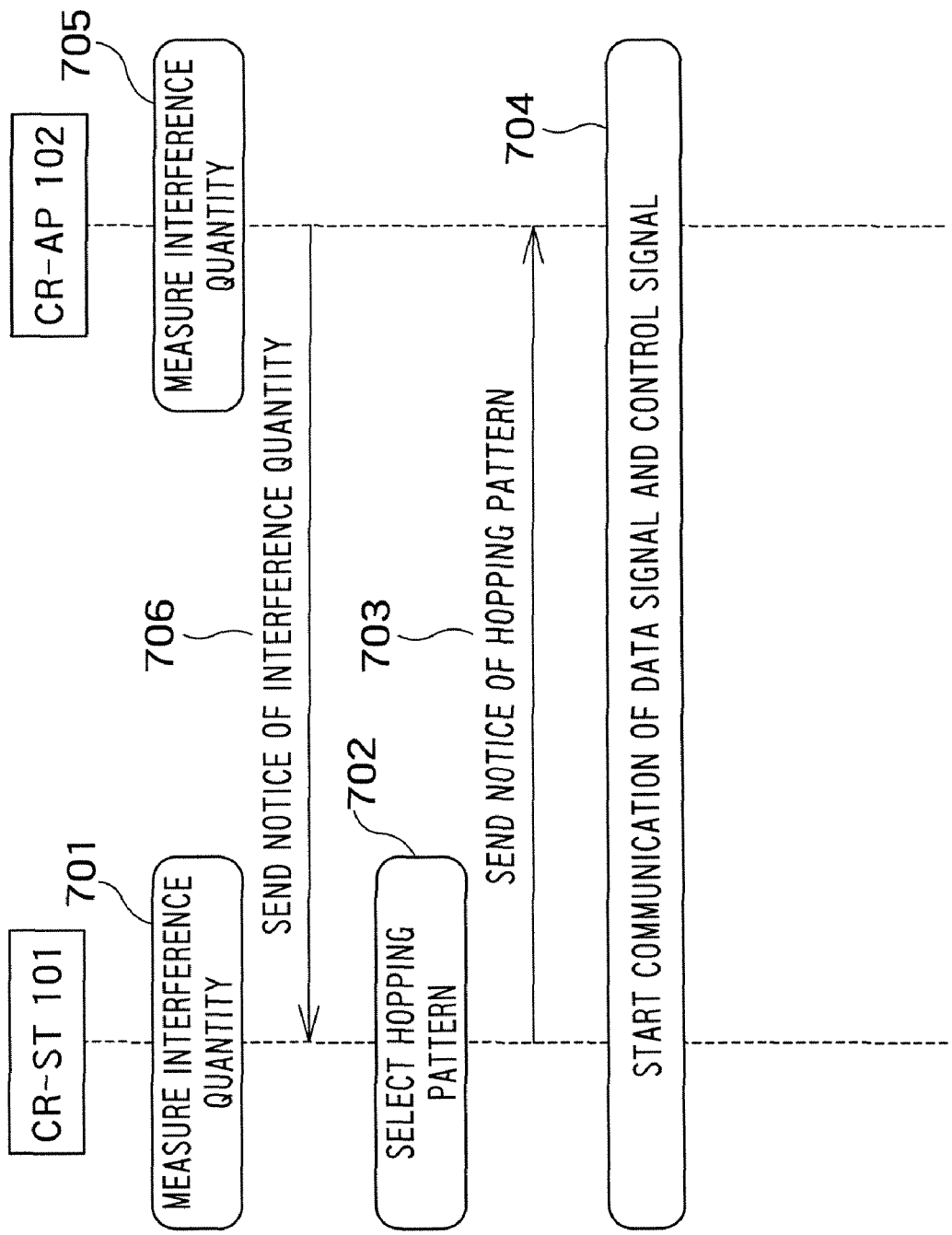
FIG. 11 is a diagram showing an example of a processing procedure at the time of start of communication between a station and an appliance in a second embodiment.

FIG. 11 shows an example of a processing procedure at the time of start of communication between the station 101 and the appliance 102 in the second embodiment.

Before starting communication, the station 101 measures the interference quantities in the frequency bands in the periphery of the station 101 (701). In detail, the measurement is performed by, for example, dividing an overall frequency band which can be used for transmission by the cognitive radio system into several parts and measuring the interference quantity in each of frequency bands obtained by the division.

The appliance 102 measures the interference quantity in the periphery at the time in the waiting state in the same way as the station 101 (705). If the frequency (number of the times) of the interference measurement is high, the measurement precision becomes high. However, if the frequency of the interference measurement is high, the power consumption in the appliance 102 at the time of waiting increases.

The station 101 is notified of the interference quantities measured in the appliance 102 (706). As for this notice method, a method of sending a notice by using a dedicated channel for notice in the overall frequency band for the cognitive radio system, a method of sending a notice by using a predetermined hopping pattern, and a method of sending a notice by wire are conceivable. If the notice of the interference quantities is sent using a dedicated channel, then the notice of the interference quantities can be sent rapidly and certainly and consequently the system throughput can be increased. If the notice of the interference quantities is sent using an already known hopping pattern (predetermined hopping pattern) for notice, then the receiving side may only wait for some of hopping pattern candidates for notice. Even if a dedicated channel is not provided, therefore, a notice of the interference quantities can be sent rapidly. If a notice is sent only when a change has occurred in the situation of the interference quantities, the number of times of interference quantity notice sending can be reduced.

Subsequently, the station 101 selects a hopping pattern for performing communication (702). The selection of the hopping pattern is performed on the basis of the interference quantities measured at the step 701 and the interference quantities measured at the step 705 in the same way as the flow shown in FIG. 6. As for the interference quantity in a certain frequency band Fn, for example, the interference quantity measured at the step 701 or the interference quantity measured at the step 705, whichever is the greater, is used. The average of these interference quantities may also be used.

The appliance 102 which is the opposite party of the communication is notified of the selected hopping pattern (703). As for this notice method, a method of sending a notice by using a dedicated channel for notice in the frequency band for the cognitive radio system, a method of sending a notice by using a predetermined hopping pattern, and a method of sending a notice by wire are conceivable. At this time, another control signal (such as, for example, a signal for synchronization) may also be contained in the notice.

Sharing of hopping pattern and synchronization are made between the station 101 and the appliance 102 according to the process heretofore described and communication is started (704).

According to the present embodiment, the hopping pattern is determined according to the interference quantities measured on both the transmission side and the reception side before the start of the communication, as heretofore described. As a result, it is possible to detect a vacant frequency band with high precision and hold down the inference exerted on the surroundings to the minimum.

Third Embodiment

Figure 12:
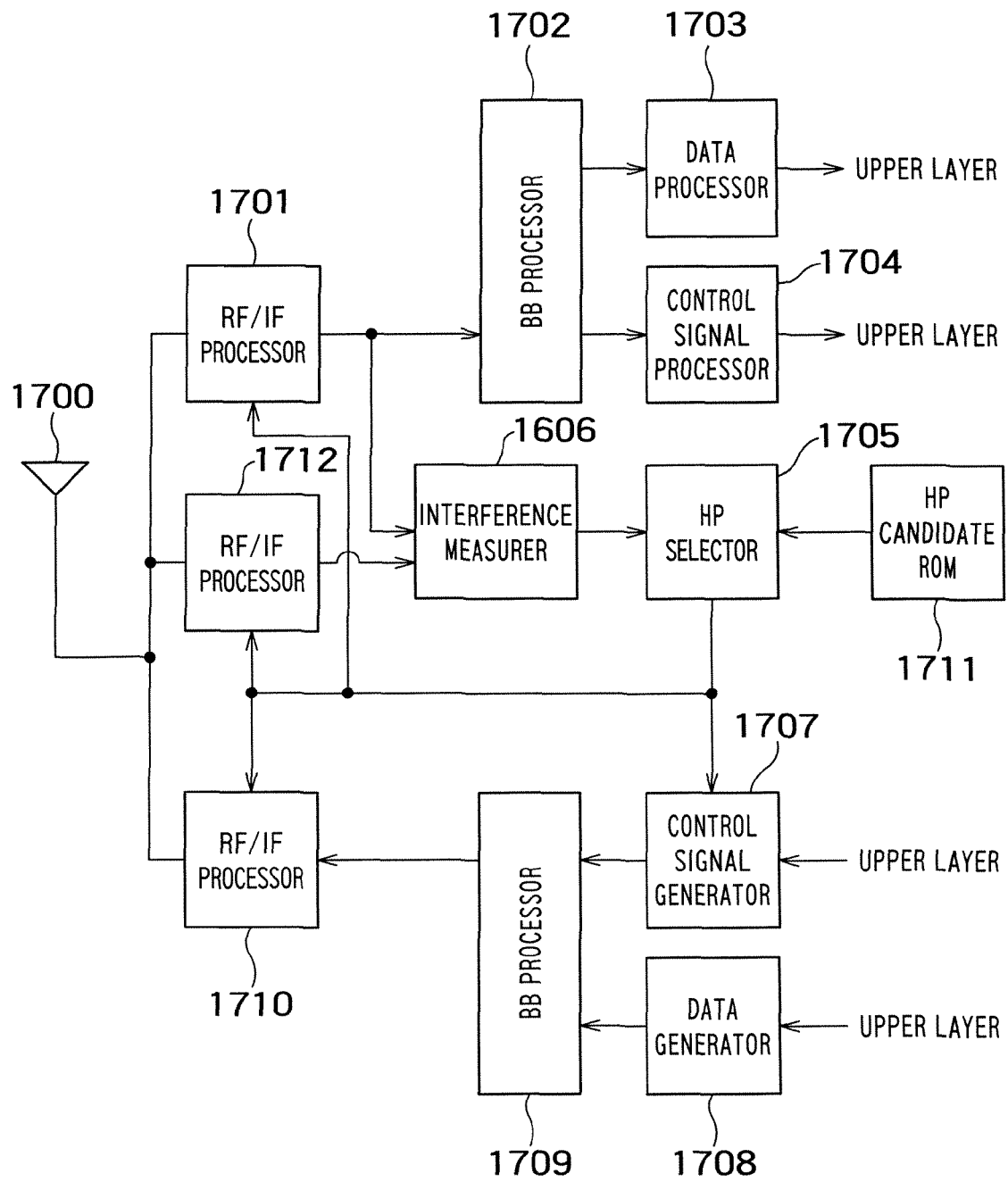
FIG. 12 is a diagram showing a configuration of a station in a third embodiment.

FIG. 12 is a diagram showing a configuration of the station 101 in a third embodiment.

Measurement of the interference quantities, selection of the hopping pattern and notification of the hopping pattern for starting the communication are performed in the same way as the first embodiment. While performing communication by using the selected hopping pattern, interference measurement is performed in order to inspect the degree of interference in the transmission band. In detail, a signal received at an antenna 1700 is subjected to RF/IF signal processing in an RF/IF processor 1712, and then converted to a baseband signal in the RF/IF processor 1712. Interference measurement processing is performed in an interference measurer 1706 by using the baseband signal. At this time, an HP selector 1705 sends a notice to the RF/IF processor 1712 so as to prevent the frequency band which becomes the subject of the interference measurement from becoming the same band as the band which is being used to perform transmission by the transmitting side (the station 101 or the appliance 102). The interference measurer 1706 outputs a result of the interference measurement to the HP selector 1705. The HP selector 1705 compares the interference quantities obtained from the measurement with a predetermined threshold, and determines whether the present hopping pattern (i.e. the hopping pattern which is now being used) is suitable on the basis of a result of the comparison and the present hopping pattern. Upon judging the hopping pattern which is now being used to be unsuitable, the HP selector 1705 reselects a hopping pattern from an HP candidate ROM 1711 in the same way as the flow shown in FIG. 6. The appliance 102 is notified of the reselected hopping pattern in the same way as the hopping pattern selected at the time of start of the communication. The station 101 performs communication of a data signal and a control signal by using the reselected hopping pattern. Other components shown in FIG. 12 are the same as those shown in FIG. 2, and consequently detailed description of them will be omitted.

The appliance 102 in the third embodiment can be implemented using the configuration shown in FIG. 3 in the same way as the appliance 102 in the first embodiment. The control signal processor 1404 decodes a control signal transmitted from the station 101, and acquires, for example, the data communication start flag, the data communication end flag, and the reselected hopping pattern. The control signal processor 1404 outputs an instruction to each block according to the acquired information. In this way, the appliance 102 grasps a change of the hopping pattern during communication, and performs communication with the station 101.

Figure 13:
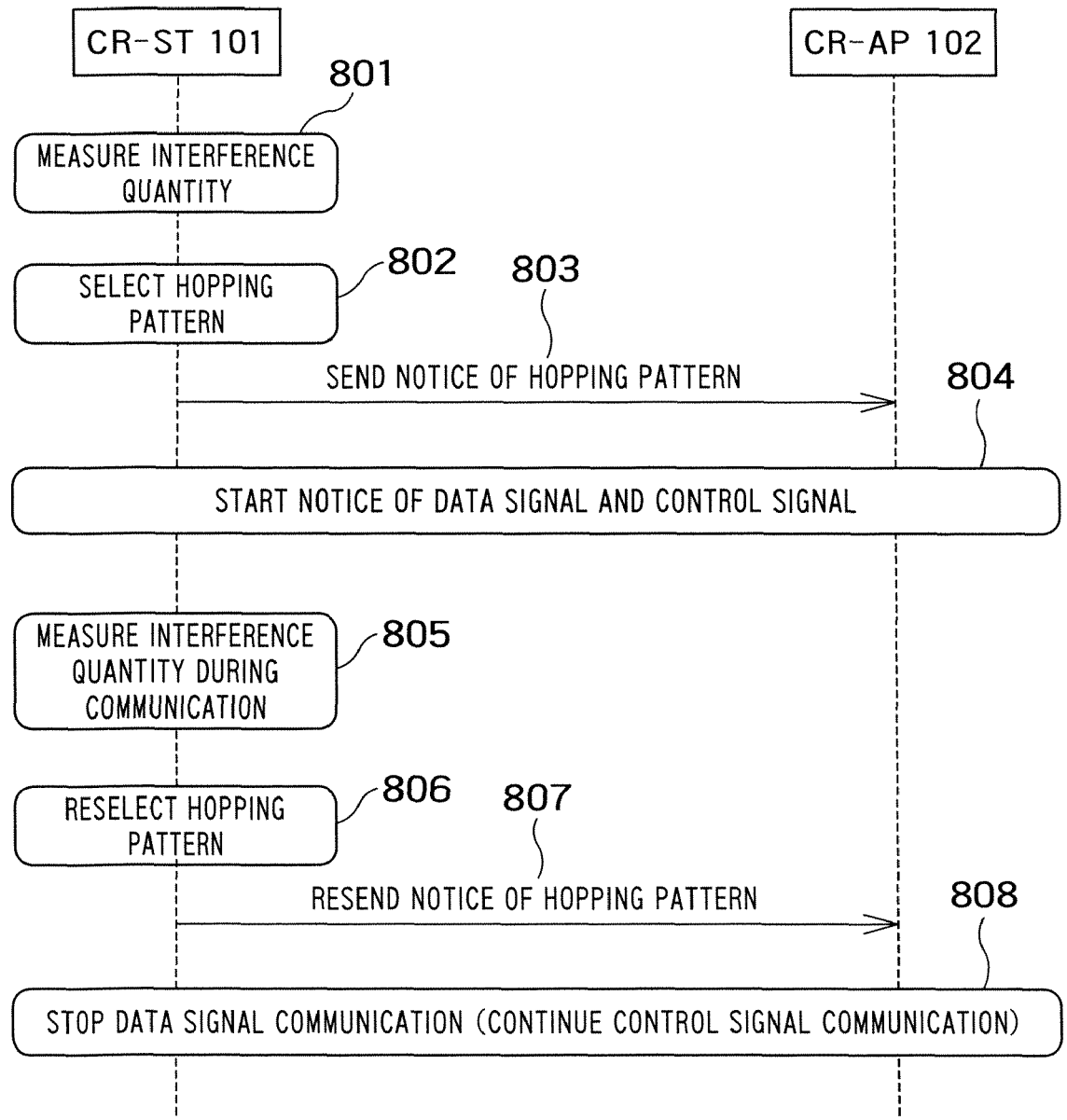
FIG. 13 is a diagram showing processing at the time of start of communication between a station and an appliance, and an example of processing procedure of a hopping pattern change during communication, in a third embodiment.

FIG. 13 is a diagram showing processing at the time of start of communication between the station 101 and the appliance 102 and an example of processing procedure of a hopping pattern change during communication, in the third embodiment.

In the same way as the first embodiment, the station 101 performs interference measurement (801), hopping pattern selection (802), and hopping pattern notification (803). Communication between the station 101 and the appliance 102 is started (804). It is now supposed in the interference measurement that a vacant channel having less interference is present and fast data communication is performed in its band.

Thereafter, during communication, the station 101 measures the interference quantities as regards the respective frequency bands in the overall frequency band which can be used to perform transmission by the cognitive radio system while performing the communication (805). It is desirable that the station 101 measures the interference quantities as regards frequency bands which are not now being used by the transmitting side and which are sufficiently apart. By selecting such a frequency band as the measurement subject, the influence of the transmission signal can be held down to the minimum by using a band-pass filter, and consequently the interference quantities can be measured with high precision.

If there is a change of the situation of the interference quantities, a hopping pattern is reselected (806). The reselection method of the hopping pattern will be described in detail later. The appliance 102 which is the opposite party of the communication is notified of the reselected hopping pattern (807). Here, It is supposed that large interference is present in the frequency band used for fast data communication, and a vacant frequency band is not present. Therefore, data communication in the frequency band used for fast data communication is stopped. Furthermore, a hopping pattern having a low hopping density in the frequency band is selected, and the appliance 102 is notified of the selected hopping pattern. As a result, communication of only the control signal is performed in frequency bands other than the frequency band which has been used for the data communication. However, low hopping density communication may be performed without completely stopping data communication in the frequency band which has been used for the data communication. Or communication of the control signal may be performed in the frequency band (808).

Thereafter, the station 101 measures the interference quantities while performing communication of only the control signal (805). Upon detecting a vacant frequency band, the station 101 selects a hopping pattern having a high hopping density in the vacant frequency band (806), notifies the appliance 102 of the selected hopping pattern by using a control signal (807), and resumes the fast data communication immediately.

The control signal includes, for example, a hopping pattern, a modulation scheme, an error correction coding factor and a data spreading factor used in data signal communication, data frame synchronization information, user identification information, a measured interference power situation, a data communication start flag, or a data communication pausing flag. As for a use example of the control signal, a control signal including the data communication pausing flag may be transmitted to the opposite party of the communication if large interference occurs and the data communication is stopped. Furthermore, if communication of only the control signal is performed and the interference signal in a certain frequency band has disappeared, then a control signal including the data communication start flag and a hopping pattern to be used for data signal communication may be transmitted to the opposite party of the communication.

Figure 14:
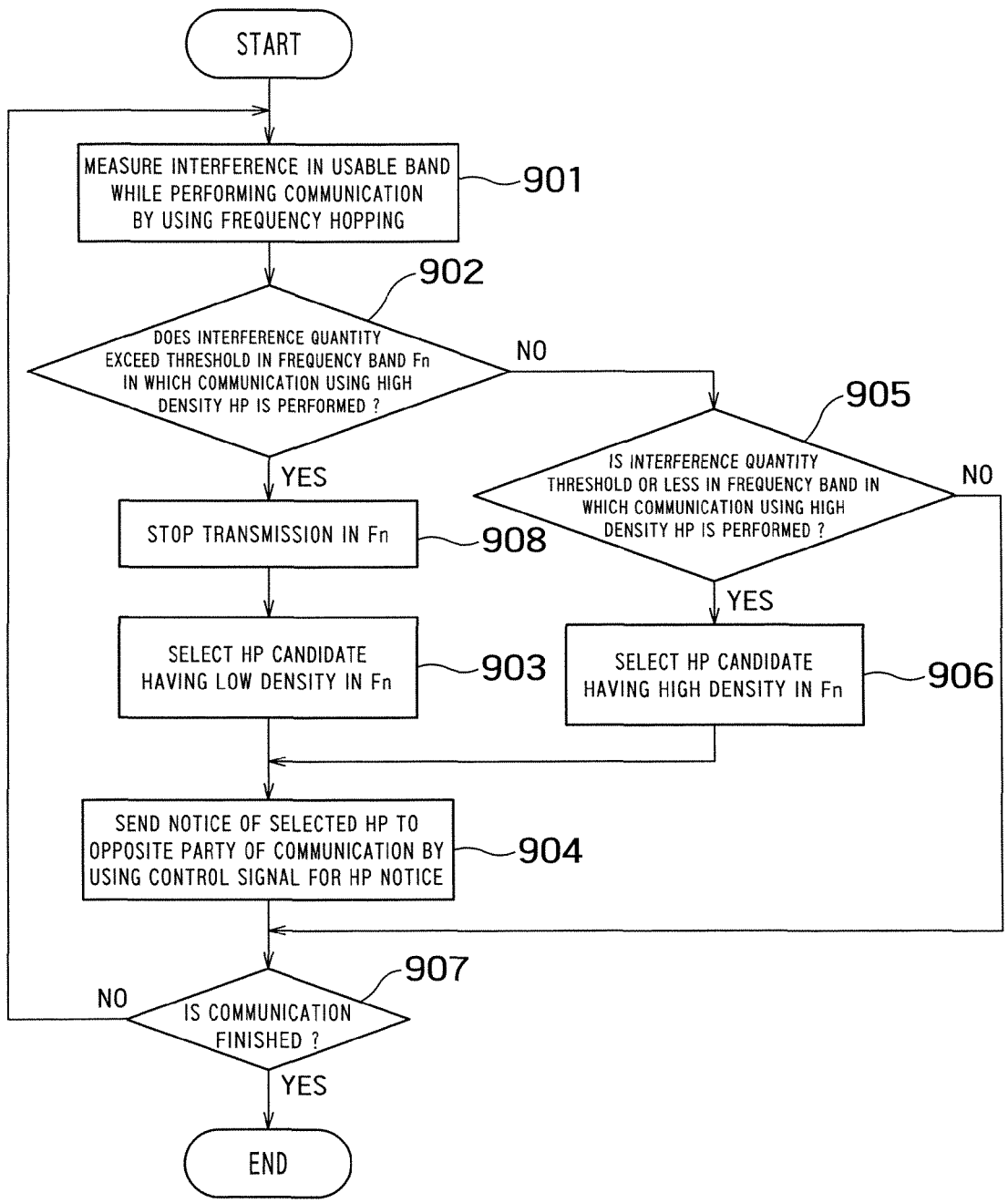
FIG. 14 is a flow chart showing an example of a hopping pattern reselection method in a third embodiment.

FIG. 14 is a flow chart showing an example of a hopping pattern reselection method in the third embodiment.

The station 101 measures interference in the frequency bands which can be used by the cognitive radio system while performing communication by using the frequency hopping (FH) (901). In detail, it is desirable that the station 101 divides an overall frequency band which can be used by the cognitive radio system into N regions and measure the interference in bands which are not used by the transmitting side for transmission. Here, N is an integer of 2 or more. As this value becomes greater, fast communication can be performed using a finer vacant frequency band. If the value of N is great, however, the number of the hopping pattern candidates increases and it takes labor to perform the selection processing.

The measured interference quantity is compared with a threshold (902). If the interference quantity exceed the threshold in the frequency band Fn in which fast data communication with a high hopping density is performed (YES at 902), then interference from another cognitive radio appliance and another system is judged to have occurred and transmission in the frequency band Fn in which transmission with a high hopping density is performed is stopped (908).

Subsequently, the station 101 selects a hopping pattern having a low hopping density in the frequency band Fn from an HP candidate ROM 1711 (903), and notifies the appliance 102 of a change of the hopping pattern by using a control signal for hopping pattern notice (904). For example, if the station 101 judges that the interference in the frequency band Fn=2 is large when using the hopping pattern No. 6 shown in FIG. 7, then the station 101 selects an HP No. 8 having a low hopping density in the frequency band Fn=2, and notifies the opposite party of the communication of the HP No. 8.

Furthermore, the station 101 compares the interference quantity with the threshold (NO at 902, and 905). If the interference quantity is the threshold or less in the frequency band Fn in which a low hopping density for the control signal communication is performed (YES at 905), the station 101 judges that communication of another cognitive radio appliance or communication of another system has finished and the frequency band Fn has changed to a vacant channel. In this case, the station 101 selects a hopping pattern having a high hopping pattern in the frequency band Fn from the HP candidate ROM 1711 (906), and notifies the appliance 102 of the selected hopping pattern, using a control signal for hopping pattern notice (904). The flow heretofore described is repeated until data to be transmitted run out (907).

According to the present embodiment, the interference quantities is measured while performing communication by using the frequency hopping and the hopping pattern is changed depending on a change of the interference quantities, as heretofore described. As a result, it is possible to utilize the frequency band efficiently, implement fast data communication, and hold down the interference exerted upon another system to the minimum. Furthermore, communication of only the control signal is continued even in bands having interference. As a result, the communication can be resumed using small overhead.

Fourth Embodiment

Figure 15:
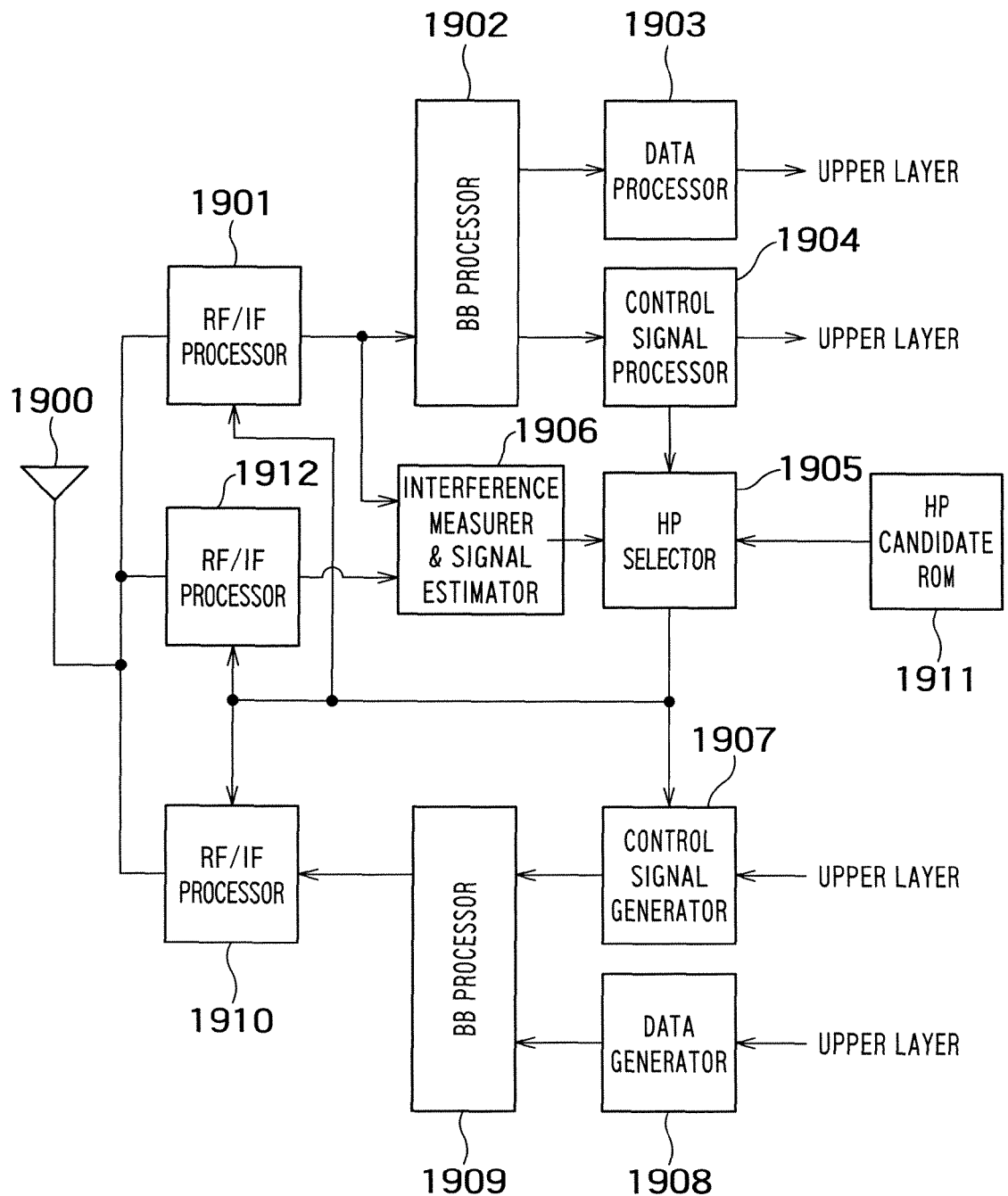
FIG. 15 is a diagram showing a configuration of a station in a fourth embodiment.

FIG. 15 shows a configuration example of the station 101 in a fourth embodiment.

The station 101 receives a radio signal at an antenna 1900, and the signal received at the antenna 1900 is subjected to RF/IF signal processing in an RF/IF processor 1901, and then converted to a baseband signal in the RF/IF processor 1901. An interference measurer & signal estimator 1906 performs the interference measurement processing and signal estimation processing by using the baseband signal. In this example, the interference measurement and signal estimation processing is performed using the baseband signal. Alternatively, the interference measurement and signal estimation processing may be performed using an RF signal or an IF signal. If it is judged that large interference is present in the interference measurement processing, then it is estimated whether the interference signal is a signal transmitted from another cognitive radio appliance or a signal transmitted from another system (such as, for example, a wireless LAN system or a broadcasting system) (signal estimation processing). A result of the interference measurement and a result of the signal estimation are input to an HP selector 1905. Furthermore, the station 101 waits for a notice of the interference measurement result and the signal estimation result from the appliance 102 in order to acquire the results of the interference measurement and the signal estimation performed by the appliance 102. The signal received at the antenna 1900 is input to a control signal processor 1904 via the RF/IF processor 1901 and a BB processor 1902. The signal transmitted from the appliance 102 is decoded in the control signal processor 1904, and a result of decoding (interference measurement result and signal estimation result) is input to the HP selector 1905. The HP selector 1905 selects a hopping pattern from an HP candidate ROM 1911 on the basis of the interference measurement result and the signal estimation result measured in the interference measurer & signal estimator 1906 and the interference measurement result and the signal estimation result notified of by the appliance 102. Details thereof will be described later. The selected hopping pattern is delivered to the RF/IF processor 1901, an RF/IF processor 1910, and a control signal generator 1907. In the control signal generator 1907, the selected hopping pattern is converted to a hopping pattern selection signal by which the hopping pattern can be identified on the appliance 102 side, multiplexed with a control signal (such as, for example, a control signal indicating data communication start time) from an upper layer, and transmitted from the antenna 1900 via a BB processor 1909 and the RF/IF processor 1910 as a hopping pattern notice. Thereafter, communication of the data signal and the control signal is started using the selected hopping pattern. In other words, the received data signal is input to a data processor 1903 via the RF/IF processor 1901 and the BB processor 1902. The received control signal is input to the control signal processor 1904. The data signal is converted in the data processor 1903 to a signal which can be understood by the upper layer (is subjected to error correction decoding and deinterleaving) and output to the upper layer. In the same way, the control signal is also converted in the control signal processor 1904 to a signal which can be understood by the upper layer, and output to the upper layer. A data signal and a control signal output from the upper layer are subjected, respectively in a data generator 1908 and the control signal generator 1907, to conversion for performing communication (such as, for example, error correction coding and interleaving), and transmitted from the antenna 1900 to the appliance 102 via the BB processor 1909 and the RF/IF processor 1910.

While performing communication by using the selected hopping pattern, the station 101 performs the interference measurement processing and the signal estimation processing in order to determine whether large interference is present in the bands which is being used for the transmission. In detail, the signal received at the antenna 1900 is subjected to RF/IF signal processing in an RF/IF processor 1912, and then converted to a baseband signal in the RF/IF processor 1912. The interference measurer & signal estimator 1906 performs the interference measurement processing and the signal estimation processing by using the baseband signal. At this time, the HP selector 1905 sends a notice to the RF/IF processor 1912 so as to prevent the frequency band in which the interference should be measured from becoming the same band as the band which is being used to perform transmission by the transmitting side (the station 101 or the appliance 102). The interference measurer & signal estimator 1906 outputs a result of the interference measurement and a result of the signal estimation to the HP selector 1905. While performing communication by using the hopping pattern, the station 101 acquires the results of the interference measurement and the signal estimation performed by the appliance 102. Upon judging the present hopping pattern to be unsuitable on the basis of the interference measurement result and the signal estimation result input from the interference measurer & signal estimator 1906 and the interference measurement result and the signal estimation result transmitted from the appliance 102, the HP selector 1905 reselects a hopping pattern from the HP candidate ROM 1911. The appliance 102 is notified of the reselected hopping pattern in the same way as the hopping pattern selected at the time of communication start. The station 101 performs communication of the data signal and control signal by using the reselected hopping pattern.

Figure 16:
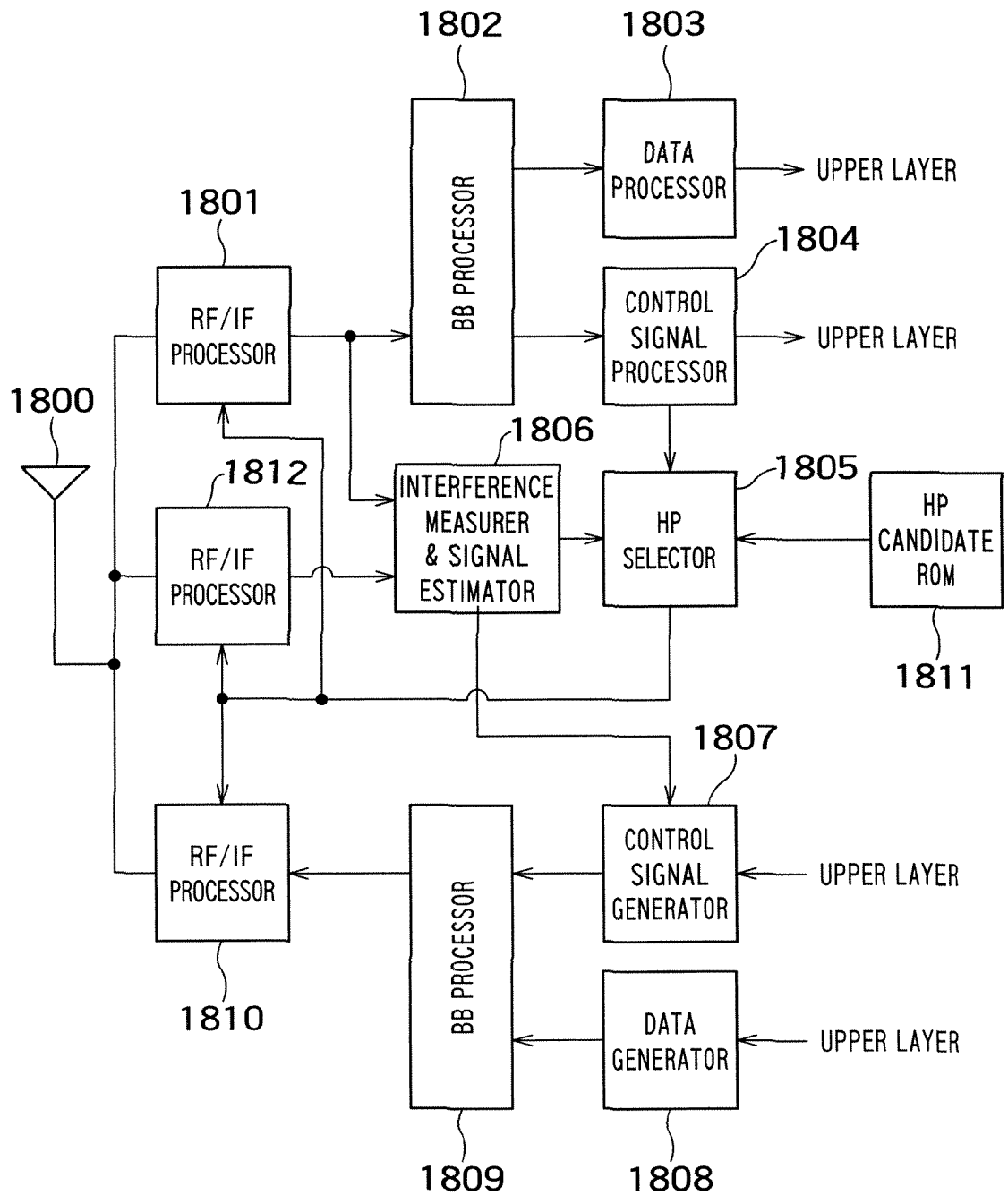
FIG. 16 is a diagram showing a configuration of an appliance in a fourth embodiment.

FIG. 16 shows a configuration example of the appliance 102 in the fourth embodiment.

The appliance 102 measures the interference quantities in the frequency bands in order to determine the hopping pattern in the station 101. In detail, the appliance 102 receives a radio signal at an antenna 1800. The signal received by the antenna 1800 is subject to RF/IF signal processing in an RF/IF processor 1801, and then converted to a baseband signal. An interference measurer & signal estimator 1806 performs interference measurement processing and signal estimation processing by using the baseband signal. In this example, the interference measurement processing and the signal estimation processing are performed using the baseband signal. Alternatively, the interference measurement processing and the signal estimation processing may be performed using an RF signal or an IF signal. If the interference is judged to be great in the interference measurement processing, then it is determined whether the interference signal is a signal transmitted from another cognitive radio appliance or a signal transmitted from another system. Results of the interference measurement and the signal estimation are multiplexed in a control signal generator 1807 with a control signal (such as, for example, a control signal indicating data communication start time), and transmitted from the antenna 1800 via a BB processor 1809 and an RF/IF processor 1810 as an interference quantity and signal estimation result notice. Furthermore, the appliance 102 waits for the hopping pattern notice transmitted from the station 101. A signal received at the antenna 1800 is passed through the RF/IF processor 1801 and a BB processor 1802, and processed in a control signal processor 1804. Upon decoding a hopping pattern selection signal contained in the hopping pattern notice transmitted from the station 101 in the control signal processor 1804, the control signal processor 1804 outputs a result of the decoding to an HP selector 1805. The HP selector 1805 takes out a hopping pattern from an HP candidate ROM 1811 on the basis of the decoded hopping pattern selection signal, and conveys the hopping pattern to the RF/IF processor 1801 and the RF/IF processor 1810. The control signal processor 1804 outputs a control signal (such as, for example, a control signal indicating data communication start time) contained in the hopping pattern notice supplied from the upper layer of the station 101 to an upper layer. Thereafter, communication of the data signal and control signal is started using the selected hopping pattern. In other words, the received data signal is input to a data processor 1803 via the RF/IF processor 1801 and the BB processor 1802. The received control signal is input to the control signal processor 1804. The data signal is converted in the data processor 1803 to a signal which can be understood by the upper layer (is subjected to error correction decoding and deinterleaving) and output to the upper layer. In the same way, the control signal is also converted in the control signal processor 1804 to a signal which can be understood by the upper layer, and output to the upper layer. A data signal and a control signal output from the upper layer are subjected, respectively in a data generator 1808 and a control signal generator 1807, to conversion for performing communication (such as, for example, error correction coding and interleaving), and transmitted from the antenna 1800 to the station 101 via a BB processor 1809 and the RF/IF processor 1810.

While performing communication by using the hopping pattern, the appliance 102 performs the interference measurement processing and the signal estimation processing in order to determine whether interference is present in the bands which is being used for the transmission by the transmitting side (the station 101 or the appliance 102). In detail, the signal received at the antenna 1800 is subjected to RF/IF signal processing in an RF/IF processor 1812, and then converted to a baseband signal in the RF/IF processor 1812. The interference measurer & signal estimator 1806 performs the interference measurement processing and the signal estimation processing by using the baseband signal. At this time, the HP selector 1805 sends a notice to the RF/IF processor 1812 so as to prevent the frequency band in which the interference signal is measured from becoming the same band as the band which is being used to perform transmission by the transmitting side. The interference measurer & signal estimator 1806 outputs a result of the interference measurement and a result of the signal estimation to the control signal generator 1807. The control signal generator 1807 multiplexes the interference measurement result and the signal estimation result with a signal sent from an upper layer, and notifies the station 101 of the results in the same way as the time at the start of the communication. The interference measurement result and the signal estimation result are used to reselect a hopping pattern in the station 101.

Figure 17:
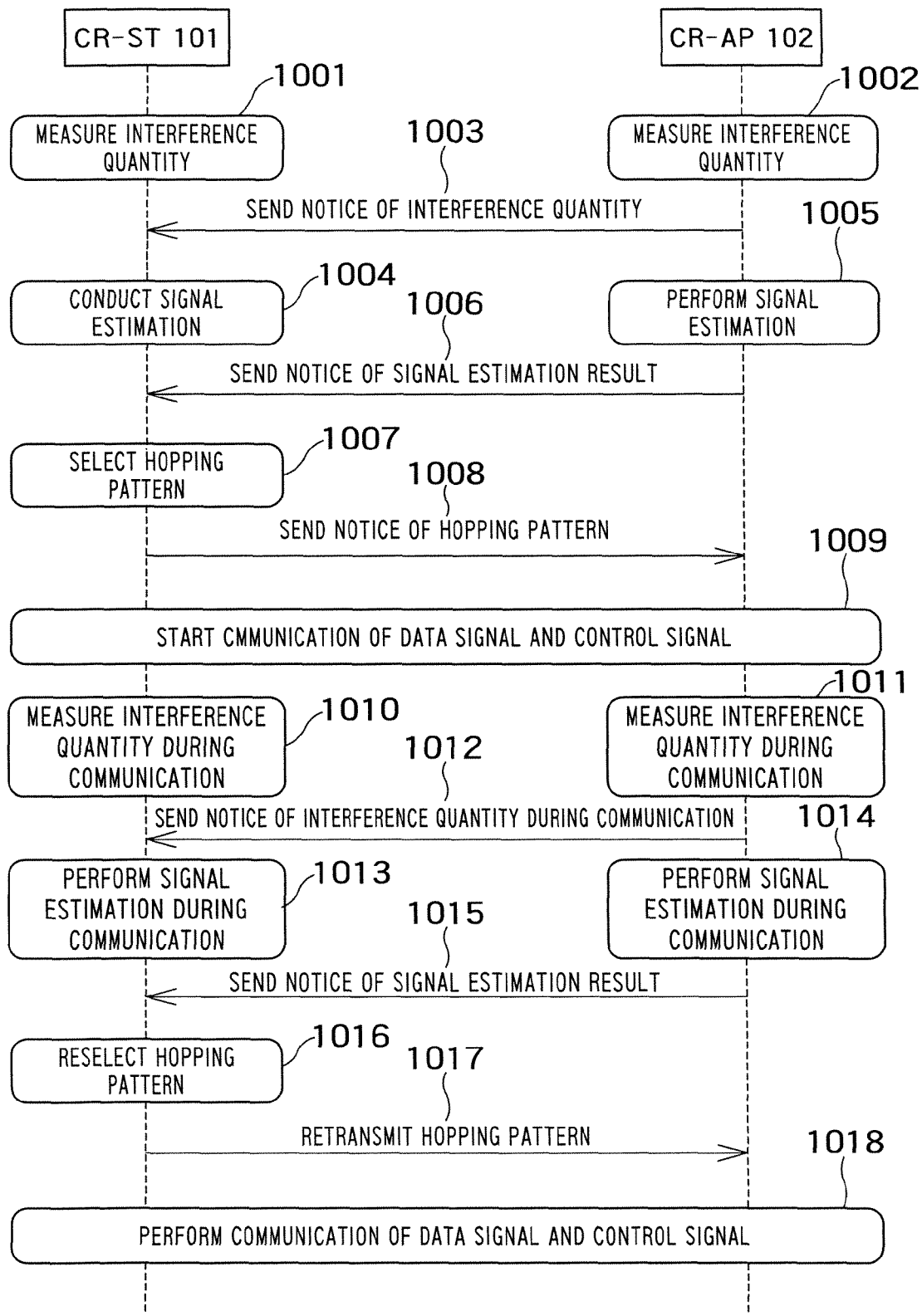
FIG. 17 is a diagram showing processing at the time of start of communication between a station and an appliance, and an example of processing procedure of a hopping pattern change during communication, in a fourth embodiment.

FIG. 17 is a diagram showing processing at the time of start of communication between the station 101 and the appliance 102 and an example of processing procedure of a hopping pattern change during communication, in the fourth embodiment.

Before starting communication, the station 101 measures the interference quantities in the frequency bands in the periphery of the station 101 (1001). In detail, the measurement is performed by, for example, dividing an overall frequency band which can be used for transmission by the cognitive radio system into several parts and measuring the interference quantity in each of frequency bands obtained by the division.

The appliance 102 measures the interference quantities in the periphery at the time in the waiting state in the same way as the station 101 (1002). If the frequency of the interference measurement is high, the measurement precision becomes high. In this case, however, the power consumption in the appliance 102 at the time of waiting increases.

The station 101 is notified of the interference quantities measured in the appliance 102 (1003). If a notice is sent only when a change has occurred in the situation of the interference quantities, the number of times of interference quantity notice sending can be reduced.

It is now supposed that large interference is present in the station 101 or the appliance 102. In this case, the station 101 or the appliance 102 estimates whether the interference signal is interference from another system or a signal from the same cognitive radio system (1004, 1005). As for the concrete estimation method, estimation based on whether the modulation scheme is the same or estimation based on whether this interference signal has one of known hopping patterns.

If it is estimated that the interference signal is given by the same cognitive radio system, it is estimated that the hopping pattern of the interference signal is one of the already known hopping patterns. The station 101 is notified of a result of the signal estimation performed by the appliance 102 (1006). A method for notification is similar to the method for notifying of the interference quantities.

The station 101 selects a hopping pattern for communication between the station 101 and the appliance 102 from among candidates of hopping pattern on the basis of the interference measurement result and the signal estimation result based on the interference measurement and the signal estimation performed by the station 101 and the interference measurement result and the signal estimation result transmitted from the appliance 102 (1007). This selection method will be described later.

The appliance 102 is notified of the selected hopping pattern (1008). According to such a procedure, sharing of the hopping pattern and synchronization are made between the station 101 and the appliance 102, and communication is started (1009). Thereafter, during the communication as well, the station 101 and the appliance 102 executes a procedure similar to the procedure heretofore described (1010 to 1018).

Figure 18:
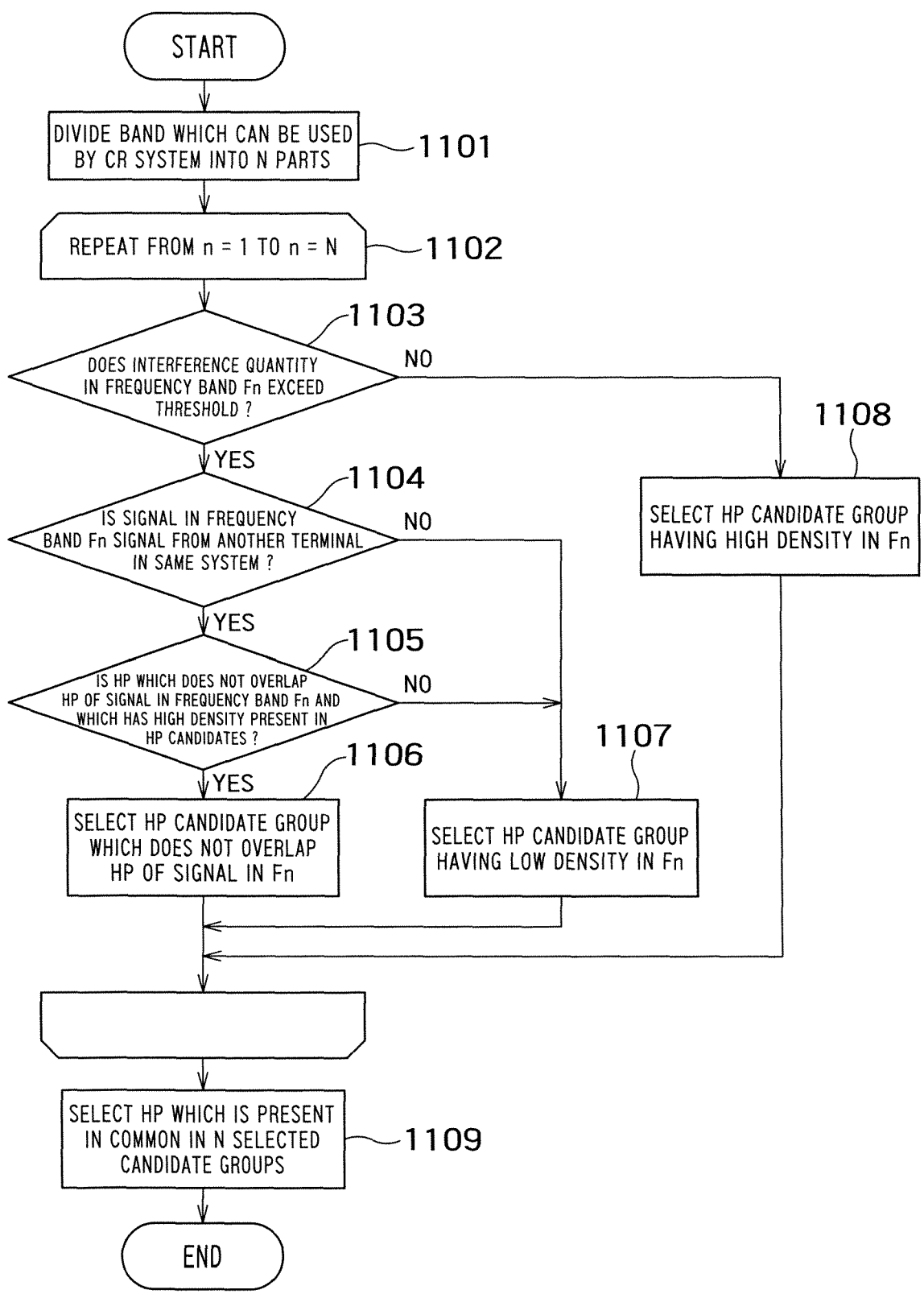
FIG. 18 is a flow chart showing an example of a hopping pattern selection method in a fourth embodiment.

FIG. 18 is a flow chart showing an example of a hopping pattern selection method at the time of communication start in the fourth embodiment.

First, the station 101 divides an overall frequency band which can be used by the cognitive radio system into N regions (1101). Here, N is an integer of 2 or more. As this value becomes greater, fast communication can be performed using finer vacant frequency bands. If N has a larger value, however, then the hopping pattern candidates increase and much labor is required for selection processing.

For each of N bands Fn (n=1 to N) obtained by the division, the following processing is performed (1102).

As to the frequency band Fn, the station compares the measured interference quantity or the interference quantity received from the appliance 102, whichever is greater, with a threshold (1103). If the interference quantity exceeds the threshold (YES at 1103), the station 101 judges the interference signal is large in the band Fn. And the station 101 estimates whether this interference signal is a signal transmitted from another cognitive radio appliance or a signal transmitted from an appliance in a system other than cognitive radio systems (1104).

If the station 101 estimates that the interference signal is a signal transmitted from another cognitive radio appliance (YES at 1104) and there is hopping pattern candidates (hopping pattern candidate group) which does not overlap a hopping pattern of a signal transmitted from another cognitive radio appliance in the frequency band Fn and which has a high hopping density in the frequency band Fn (YES at 1105), then the station 101 selects the hopping pattern candidate group (1106). If a signal estimation result is received from the appliance 102, however, it is also possible to proceed to the step 1106 only when the estimation result also indicates that the interference signal is a signal transmitted from another cognitive radio appliance and proceed to step 1107 otherwise.

On the other hand, if it is estimated that the interference signal in the frequency band Fn is not a signal transmitted from another cognitive radio appliance (NO at 1104), or if there isn't a hopping pattern candidate which does not overlap a hopping pattern of a signal transmitted from another cognitive radio appliance in the frequency band Fn and which has a high hopping density in the frequency band Fn (NO at 1105), even if it can be estimated that the interference signal is a signal transmitted from another cognitive radio appliance, then the station 101 selects hopping pattern candidates (hopping pattern candidate group )having a low hopping density in the frequency band Fn (1107).

If the interference quantity in the frequency band Fn is the threshold or less (NO at 1103), the station 101 selects a hopping pattern candidate group having a high hopping density in the frequency band Fn (1108).

Finally, the station 101 selects a hopping pattern which is present in common in N hopping pattern candidate groups as the hopping pattern to be used for the communication (1109).

Figure 19:
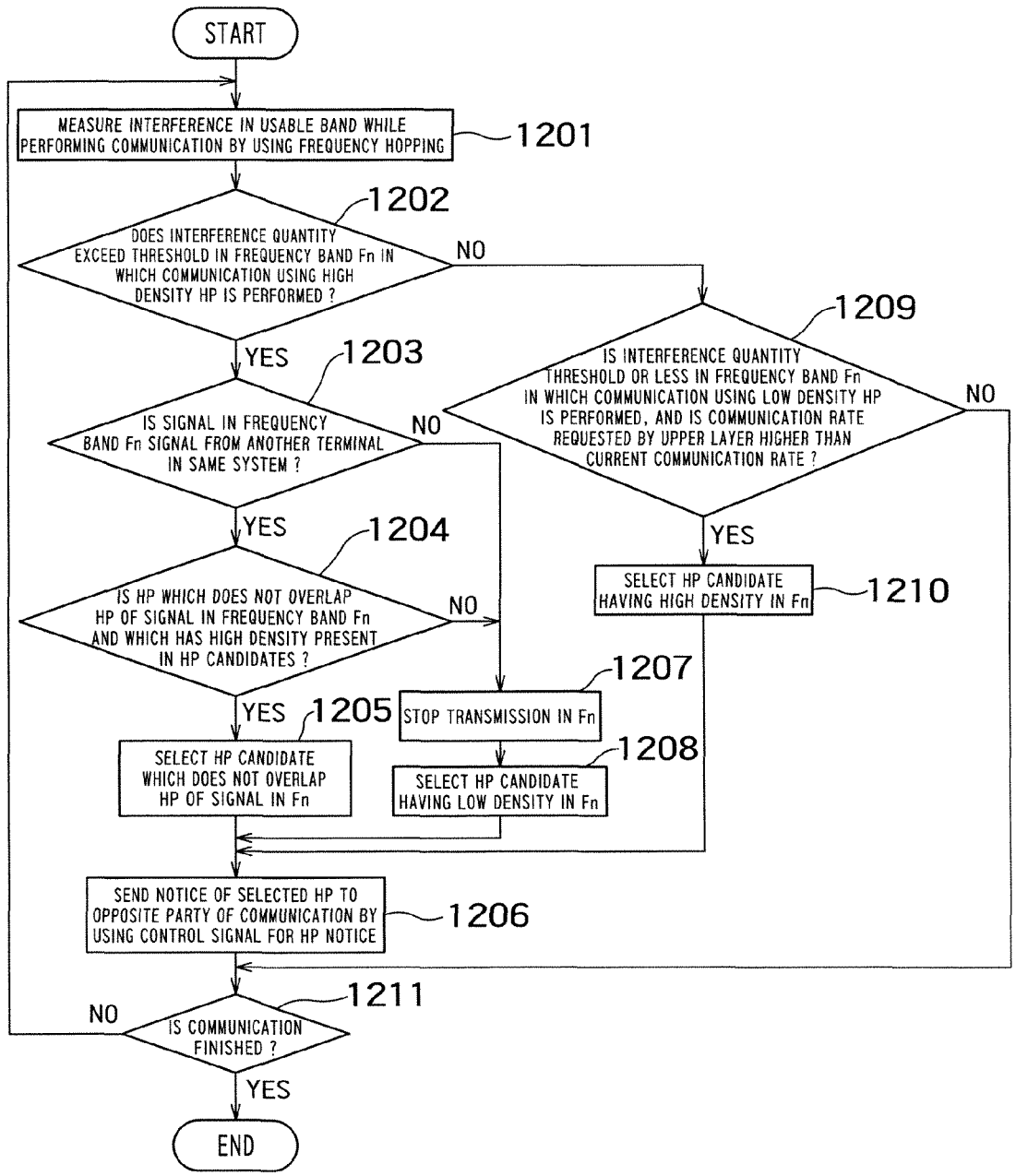
FIG. 19 is a flow chart showing an example of a hopping pattern reselection method in a fourth embodiment.

FIG. 19 is a flow chart showing an example of a hopping pattern reselection method in the fourth embodiment.

The station 101 and the appliance 102 measure interference quantities in the frequency bands which can be used by the cognitive radio system while performing communication by using the frequency hopping (1201). In detail, an overall band which can be used by the cognitive radio system is divided into N regions and interference is measured in a band which is not being used by the transmitting side for transmission. Here, N is an integer of 2 or more. As this value becomes greater, fast communication can be performed using a finer vacant frequency band. If the value of N is great, however, the number of the hopping pattern candidates increases and it takes labor to perform the selection processing.

After the measurement of interference, the station 101 compares the measured interference quantity or the interference quantity received from the appliance 102, whichever is greater, with a threshold. The station 101 determines whether the interference quantity exceeds the threshold in the frequency band Fn which is being used for fast data communication with a high hopping density (1202).

If the interference quantity exceeds the threshold (YES at 1202), the station 101 estimates whether the interference signal is a signal from an appliance which belongs to the same cognitive radio system as that of the station 101 and the appliance 102 or a signal from another system (1203).

If the station 101 estimates that the interference signal is a signal transmitted from an appliance belonging to the same cognitive radio system (YES at 1203), the station 101 determines whether there is a hopping pattern candidate group which does not overlap a hopping pattern of an interference signal transmitted from another appliance in the frequency band Fn and which has a high hopping density in the frequency band Fn (1204).

If there is a hopping pattern candidate group which does not overlap the hopping pattern of the interference signal in the frequency band Fn and which has a high hopping density in the frequency band Fn (YES at 1204), then the station 101 selects one hopping pattern from the hopping pattern candidate group (1205), and sends a notice of the selected hopping pattern to the appliance 102 by using a control signal for hopping pattern notice (1206). If a signal estimation result is received from the appliance 102, however, it is also possible to proceed to the step 1205 only when the estimation result also indicates that the interference signal is a signal transmitted from another cognitive radio appliance and proceed to step 1207 otherwise.

If it is estimated at the step 1203 that the interference signal in the frequency band Fn is not a signal from the same cognitive radio appliance (NO at 1203), or if there isn't hopping pattern candidates (hopping pattern candidate group) which do not overlap a hopping pattern of an interference signal from another appliance in the frequency band Fn and which has a high hopping density in the frequency band Fn (NO at 1204), then the station 101 stops transmission in the frequency band Fn which is being used for transmission with a high hopping density (1207). Thereafter, the station 101 selects a hopping pattern having a low hopping density in the frequency band Fn (1208), and sends a notice of a hopping pattern change to the appliance 102 by using a control signal for hopping pattern notice (1206).

On the other hand, if the interference quantity is the threshold or less in the frequency band Fn which is being used for fast data communication with a high hopping density at the step 1202 (NO at 1202), the station 101 determines whether the interference quantity is the threshold or less in the frequency band Fn which is being used for communication with a low hopping density and the communication rate requested from an upper layer is higher than the rate of the communication which is being currently performed (1209).

If the interference quantity is the threshold or less and communication faster than the current communication rate is requested (YES at 1210), the station 101 selects a hopping pattern having a hopping density in the frequency band Fn (1210) and notifies the appliance 102 of the selected hopping pattern.

The flow heretofore described is repeated until data to be transmitted run out (1211).

According to the present embodiment, the interference measurement processing and the signal estimation processing are performed in each of the station and the appliance and a hopping pattern is selected according to results of the interference measurement processing and the signal estimation processing, as heretofore described. As a result, judgment with higher precision becomes possible. Therefore, it becomes possible to share a vacant frequency band with high precision and improve the system throughput. Furthermore, a cognitive radio system capable of coping with an environment change fast can be implemented by continuing communication of only the control signal even in the frequency band in which the interference is present.

What is claimed is:

1. A wireless communication apparatus using a frequency hopping scheme, which performs wireless communication with a different wireless communication apparatus by using a plurality of frequency bands, comprising:
   an interference measurer configured to measure interference quantities showing strength of interference signals in respective frequency bands;
   a hopping pattern storage configured to store a plurality of hopping patterns each having hopping densities set for the respective frequency bands, the hopping densities being a number of times that transmission is performed per unit time in the respective frequency bands, the number of times being larger than 0;
   a hopping pattern selector configured to select a hopping pattern from the hopping pattern storage on the basis of the interference quantities in the respective frequency bands;
   a hopping pattern notifier configured to notify the different wireless communication apparatus of the selected hopping pattern; and
   a communicator configured to communicate with the different wireless communication apparatus by using the selected hopping pattern,
   wherein the hopping pattern selector selects the hopping pattern which has a first hopping density for frequency bands where an interference quantity is not greater than a threshold, and which has a second hopping density less than the first hopping density for frequency bands where an interference quantity is more than the threshold.

2. The apparatus according to claim 1, further comprising:
   an estimator configured to estimate whether an interference in each of the frequency bands is due to a signal transmitted from a further wireless communication apparatus other than the different wireless communication apparatus,
   wherein if frequency bands exist whose interference is due to a signal from the further wireless communication apparatus and interference quantity is more than the threshold, the hopping selector selects a hopping pattern which does not collide with a hopping pattern of the further wireless communication apparatus in that frequency bands.

3. The apparatus according to claim 2, wherein
   the communicator receives a result of the estimation performed at the different wireless communication apparatus, and
   if in both the received result of the estimation and a result of the estimation performed by the estimator, frequency bands exist whose interference is due to a signal from the further wireless communication apparatus and interference quantity is more than the threshold, the hopping selector selects a hopping pattern which does not collide with a hopping pattern of the further wireless communication apparatus in that frequency bands.

4. The apparatus according to claim 1, wherein the communicator transmits and receives a control signal in frequency bands having the second hopping density.

5. The apparatus according to claim 4, wherein the communicator transmits or receives a data signal in frequency bands having the first hopping density.

6. The apparatus according to claim 5, wherein in a case where the selected hopping pattern does not include a frequency band having the first hopping density, the communicator stops transmitting or receiving the data signal and continues to transmit and receive only the control signal.

7. The apparatus according to claim 5, wherein the communicator applies a first spreading factor to the control signal and applies a second spreading factor which is lower than the first spreading factor to the data signal.

8. The apparatus according to claim 6, wherein the communicator applies a first spreading factor to the control signal and applies a second spreading factor which is lower than the first spreading factor to the data signal.

9. The apparatus according to claim 1, wherein
   the communicator receives information of an interference quantity in each of the frequency bands measured at the different wireless communication apparatus, and
   the hopping selector selects a hopping pattern on the basis of the interference quantity in each of the frequency bands measured by the interference measurer and the interference quantity in each of the frequency bands received from the different wireless communication apparatus.

10. The apparatus according to claim 9, wherein the hopping pattern selector selects a hopping pattern on the basis of a greater one of the measured interference quantity and the received interference quantity every frequency band.

11. The apparatus according to claim 10, wherein the hopping pattern selector selects a hopping pattern which has a first hopping density in frequency bands where the greater one is a threshold or less, and which has a second hopping density less than the first hopping density in frequency bands where the greater one is more than the threshold.

12. The apparatus according to claim 11, wherein the communicator transmits and receives a control signal in frequency bands having the second hopping density.

13. The apparatus according to claim 12, wherein the communicator transmits or receives a data signal in frequency bands having the first hopping density.

14. The apparatus according to claim 13, wherein in a case where the selected hopping pattern does not include a frequency band having the first hopping density, the communicator stops transmitting or receiving the data signal and continues to transmit and receive only the control signal.

15. The apparatus according to claim 13, wherein the communicator applies a first spreading factor to the control signal and applies a second spreading factor which is lower than the first spreading factor to the data signal.

16. The apparatus according to claim 14, wherein the communicator applies a first spreading factor to the control signal and applies a second spreading factor which is lower than the first spreading factor to the data signal.

17. The apparatus according to claim 1, wherein
an index is associated with each of the hopping patterns in the hopping pattern storage, and
the hopping pattern notifier notifies the different wireless communication apparatus of the index of the selected hopping pattern.

18. A wireless communication method using a frequency hopping scheme, which performs wireless communication with a different wireless communication apparatus by using a plurality of frequency bands, comprising:
measuring interference quantities showing strength of interference signals in respective frequency bands;
selecting a hopping pattern from a plurality of hopping patterns each having hopping densities set for the respective frequency bands on the basis of the interference quantities in the respective frequency bands, the hopping densities being a number of times that transmission is performed per unit time in the respective frequency bands, the number of times being larger than 0;
notifying the different wireless communication apparatus of the selected hopping pattern; and
communicating with the different wireless communication apparatus by using the selected hopping pattern,
wherein selecting the hopping pattern includes selecting a hopping pattern which has a first hopping density for frequency bands where an interference quantity is not greater than a threshold, and which has a second hopping density less than the first hopping density for frequency bands where an interference quantity is more than the threshold.

* * * * *